US007884862B2

(12) United States Patent
Ishii et al.

(10) Patent No.: US 7,884,862 B2
(45) Date of Patent: Feb. 8, 2011

(54) CAMERA AND CAMERA ZOOM CONTROL METHOD

(75) Inventors: Akihiro Ishii, Saitama-ken (JP); Keizo Uchioke, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 986 days.

(21) Appl. No.: 11/011,071

(22) Filed: Dec. 15, 2004

(65) Prior Publication Data

US 2005/0134709 A1 Jun. 23, 2005

(30) Foreign Application Priority Data

Dec. 17, 2003 (JP) ............................. 2003-419625

(51) Int. Cl.
*H04N 5/262* (2006.01)
*H04N 15/00* (2006.01)
*H04N 13/00* (2006.01)
*H04N 5/225* (2006.01)
*H04N 5/228* (2006.01)
*H04N 5/232* (2006.01)
*G03B 13/00* (2006.01)

(52) U.S. Cl. ............... 348/240.3; 348/42; 348/46; 348/218.1; 348/222.1; 348/240.99; 348/239; 348/262; 348/335; 348/347

(58) Field of Classification Search ............ 348/240.99, 348/240.1, 46, 42, 49, 240.3; 396/133
See application file for complete search history.

(56) References Cited

U.S. PATENT DOCUMENTS

| 5,436,660 | A | * | 7/1995 | Sakamoto | ............... | 348/229.1 |
|---|---|---|---|---|---|---|
| 5,903,303 | A | * | 5/1999 | Fukushima et al. | ........... | 348/47 |
| 6,112,033 | A | * | 8/2000 | Yano et al. | ................... | 396/323 |
| 6,559,888 | B1 | | 5/2003 | Doron | | |
| 6,563,543 | B1 | | 5/2003 | Doron | | |
| 6,670,989 | B2 | * | 12/2003 | Kawanishi et al. | ..... | 348/240.99 |
| 6,693,667 | B1 | * | 2/2004 | Doron | ................... | 348/240.99 |
| 2003/0020814 | A1 | * | 1/2003 | Ono | ....................... | 348/220.1 |
| 2003/0048374 | A1 | * | 3/2003 | Minakuti et al. | ............ | 348/360 |
| 2003/0076407 | A1 | * | 4/2003 | Uchiyama et al. | ............. | 348/46 |
| 2003/0160886 | A1 | * | 8/2003 | Misawa et al. | .............. | 348/347 |
| 2004/0036777 | A1 | * | 2/2004 | Yasuda | .................... | 348/211.9 |
| 2004/0090546 | A1 | | 5/2004 | Doron | | |

FOREIGN PATENT DOCUMENTS

| JP | 11-327041 | 11/1999 |
|---|---|---|
| JP | 2000-111785 A | 4/2000 |
| JP | 2000-224455 A | 8/2000 |
| JP | 2001-211373 A | 8/2001 |
| JP | 2001-320626 | 11/2001 |
| JP | 2002-033951 | 1/2002 |

* cited by examiner

*Primary Examiner*—Jason Chan
*Assistant Examiner*—Michael Osinski
(74) *Attorney, Agent, or Firm*—Birch, Stewart, Kolasch & Birch, LLP

(57) ABSTRACT

The present invention provides a camera and a camera zoom control method that can reduce power consumption at the time of zooming and shorten the time difference between the timing of a photographing instruction and the timing of actual photographing. Until a release button is operated, the optical zoom magnifying power of a lens is controlled to become a zoom magnifying power corresponding to an operation with respect to a zoom switch, and when the release button has been operated, the optical zoom magnifying power of the lens is controlled to become the zoom magnifying power corresponding to the operation with respect to the zoom switch.

10 Claims, 12 Drawing Sheets

F I G. 4
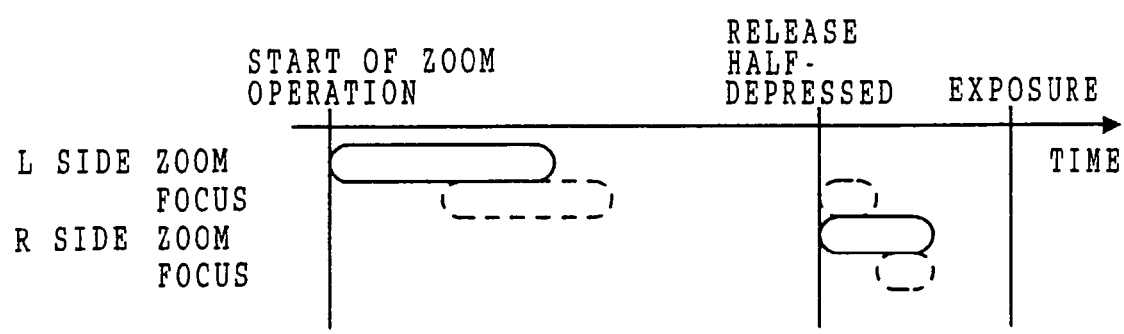

CAMERA AND CAMERA ZOOM CONTROL METHOD

CROSS-REFERENCE TO RELATED APPLICATION

This application claims priority under 35 USC 119 from Japanese Patent Application No. 2003-419625 the disclosures of which are incorporated by reference herein.

BACKGROUND OF THE INVENTION

1. Field of the Invention

The present invention relates to a camera and a camera zoom control method, and in particular to a camera and a camera zoom control method where plural lenses that image a subject image are disposed at respectively different positions and which can conduct stereo photographing using the plural lenses.

2. Description of the Related Art

In recent years, digital cameras, such as digital still cameras and digital video cameras, provided with both an optical zoom function and an electronic zoom function have become more common.

Conventionally, in digital cameras of this type, from the standpoint of maintaining the quality of images (subject images) obtained by photographing, zooming in the range of the corresponding zoom magnifying power with the optical zoom function has been conducted with the optical zoom function, and zooming resulting from the electronic zoom function has been conducted only when conducting zooming exceeding this range. The electronic zoom function is also called a digital zoom function, but in the present specification both will be collectively referred to as an "electronic zoom function".

When zooming is conducted with the optical zoom function, it is necessary to move the lens disposed in the digital camera to change the focal length resulting from the lens. A motor (called a "zoom motor" below) such as a stepping motor is usually used as moving means for this purpose (e.g., see Japanese Patent Application Laid-Open Publication (JP-A) Nos. 2000-224455 and 2001-211373).

Thus, in digital cameras of this type, the zoom motor is driven when zooming is conducted in the range of the corresponding zoom magnifying with the optical zoom function. Therefore, there has been the problem that the power consumption is large.

In this manner, when the power consumption at the time of zooming is large, in a digital camera using a battery as the power source assuming use in a mobile environment, the problem arises that the number of photographing images is reduced due to the affect of the power consumed by the zoom motor. In a digital camera that can execute various kinds of internal processing in a multitask manner with the purpose of speeding up the photographing speed, the problem arises that sometimes a limit must be imposed, due to the affect of the power consumed by the zoom motor, on the internal processing that can be executed in parallel.

Thus, in order to solve the problem that the power consumption at the time of zooming is large, JP-A No. 2000-111785 proposes technology where a subject image, to which electronic zoom processing has been carried out in accordance with the focal length set by a zoom button without moving the zoom mechanism of the lens, is displayed on a monitor at the point in time prior to photographing, and at the time of photographing, the lens is set by the zoom mechanism to the set focal distance, whereby the power consumption by the zoom mechanism at the time of zooming is reduced.

In recent years, interest with respect to three-dimensional stereo images has risen, and cameras that can conduct stereo photographing (here, called "stereo cameras") are also being manufactured.

Stereo cameras of this type are usually provided with plural imaging systems for photographing a subject and configured to record, as image information representing a stereo image, information of plural images obtained by conducting photographing with each imaging system at the same time from different positions. Additionally, when conducting zooming in such a stereo camera, the zoom magnifying powers of the imaging systems are set to the same zoom magnifying power corresponding to the zoom operation by the user.

Thus, by applying the technology of JP-A No. 2000-111785 to a stereo camera of this type, conducting electronic zoom processing in regard to each imaging system prior to photographing and setting the optical zoom at the time of photographing, the power consumed by the zoom mechanism of each imaging system at the time of photographing can be reduced.

However, when the technology of JP-A No. 2000-111785 is applied to a conventional stereo camera, the power consumed at the time of zooming can be reduced but the zoom mechanisms are moved only at the time of photographing. Thus, there is no problem when the difference between the zoom magnifying power set by electronic zoom processing prior to photographing and the zoom magnifying power of the optical zoom set at the point in time of photographing is small, but when this difference is large, such as when the zoom magnifying power set by electronic zoom processing is the minimum zoom magnifying power and the zoom magnifying power of the optical zoom set at the time of photographing is the maximum zoom magnifying power, there is the problem that the time difference between the timing of the photographing instruction resulting from depressing the release button (the shutter) and the timing of the actual photographing becomes large. When this time difference is large, not only does the feeling of operation at the time of photographing become uncomfortable for the user, but sometimes the precious opportunity to capture the subject at just the right time is missed, and this problem is serious.

SUMMARY OF THE INVENTION

The present invention has been made in order to solve the above-described problems, and provides a camera and a camera zoom control method that can reduce the power consumption at the time of zooming and shorten the time difference between the timing of the photographing instruction and the timing of the actual photographing.

A first aspect of the invention provides a camera including: plural lenses that are disposed at respectively different positions and image a subject image; plural moving units that respectively correspond to the plural lenses and cause positions of the corresponding lenses to move in an optical axis direction to change optical zoom magnifying power of the corresponding lenses; a zoom operation unit that is operated when changing the zoom magnifying power of the subject image; a photographing operation unit that is operated when executing photographing; and a control unit which, until the photographing operation unit is operated, controls the moving unit corresponding to one of the plural lenses so that the optical zoom magnifying power of the one of the lenses becomes a zoom magnifying power corresponding to an operation with respect to the zoom operation unit, and when the photographing operation unit has been operated, controls the moving unit corresponding to another one of the lenses so that the optical zoom magnifying power of the other of the lenses becomes a zoom magnifying power corresponding to the operation with respect to the zoom operation unit.

According to the camera of the first aspect, the subject image is imaged by plural lenses disposed at respectively different positions. Also, the positions of the lenses are moved in the optical axis direction by the moving units corresponding to the respective plural lenses in order to change the optical zoom magnifying powers of the corresponding lenses.

The moving units correspond to the aforementioned zoom motors, and various moving units can be used therefor as long as they can electrically move the lenses of the present invention in the optical axis direction, such as motors like stepping motors and DC (direct current) motors or solenoids. Also, each of the plural lenses may be configured by simply one lens or by plural lenses. In the case where each lens is configured by plural lenses, the moving units act to cause at least one of the plural lenses in the optical axis direction.

Also, in the camera of the first aspect, when the zoom magnifying power of the subject image is to be changed, the zoom operation unit is operated, and when photographing is to be executed, the photographing operation unit is operated. Namely, the zoom operation unit and the photographing operation unit of the present invention respectively correspond to a zoom switch and a release button usually disposed in cameras provided with a zoom function.

Here, in the camera of the first aspect, until the photographing operation unit is operated, the moving unit corresponding to the one of the plural lenses is controlled so that the optical zoom magnifying power of that one of the lenses becomes a zoom magnifying power corresponding to an operation with respect to the zoom operation unit, and when the photographing operation unit has been operated, the moving unit corresponding to the other of the lenses is controlled so that the optical zoom magnifying power of that other of the lenses becomes a zoom magnifying power corresponding to the operation with respect to the zoom operation unit.

In this manner, according to the camera of the first aspect, until the photographing operation unit is operated, the optical zoom magnifying power of the one of the plural lenses is controlled so that it becomes a zoom magnifying power corresponding to an operation with respect to the zoom operation unit, and when the photographing operation unit has been operated, the optical zoom magnifying power of the other of the lenses is controlled so that it becomes a zoom magnifying power corresponding to the operation with respect to the zoom operation unit. Thus, the power consumption at the time of zooming can be reduced, and the time difference between the timing of the photographing instruction and the timing of the actual photographing can be shortened.

Also, a second aspect of the invention provides a camera including: plural lenses that are disposed at respectively different positions and image a subject image; plural moving units that respectively correspond to the plural lenses and cause positions of the corresponding lenses to move in an optical axis direction to change optical zoom magnifying power of the corresponding lenses; a zoom operation unit that is operated when changing the zoom magnifying power of the subject image; a photographing operation unit that is operated when executing photographing; and a control unit which, until the photographing operation unit is operated, controls the moving unit corresponding to one of the plural lenses so that the optical zoom magnifying power of that one of the lenses becomes a zoom magnifying power corresponding to an operation with respect to the zoom operation unit, and controls the moving unit corresponding to another one of the lenses so that the optical zoom magnifying power of that other one of lenses follows the changing of the optical zoom magnifying power of the one of the lenses at a predetermined time difference.

According to the camera of the second aspect, the subject image is imaged by plural lenses disposed at respectively different positions. Also, the positions of the lenses are moved in the optical axis direction by the moving units corresponding to the respective plural lenses in order to change the optical zoom magnifying powers of the corresponding lenses.

The moving units correspond to the aforementioned zoom motors, and various moving units can be used therefor as long as they can electrically move the lenses of the present invention in the optical axis direction, such as motors like stepping motors and DC (direct current) motors or solenoids. Also, each of the plural lenses may be configured by simply one lens or by plural lenses. In the case where each lens is configured by plural lenses, the moving units act to cause at least one of the plural lenses in the optical axis direction.

Also, in the camera of the second aspect, when the zoom magnifying power of the subject image is to be changed, the zoom operation unit is operated, and when photographing is to be executed, the photographing operation unit is operated. Namely, the zoom operation unit and the photographing operation unit of the present invention respectively correspond to a zoom switch and a release button usually disposed in cameras provided with a zoom function.

Here, in the camera of the second aspect, until the photographing operation unit is operated, the moving unit corresponding to the one of the plural lenses is controlled so that the optical zoom magnifying power of that one of the lenses becomes a zoom magnifying power corresponding to an operation with respect to the zoom operation unit, and the moving unit corresponding to the other one of the lenses is controlled so that the optical zoom magnifying power of the other one of the lenses follows the changing of the optical zoom magnifying power of the one of the lenses at a predetermined time difference.

In this manner, according to the camera of the second aspect, until the photographing operation unit is operated, the optical zoom magnifying power of the one of the plural lenses is controlled so that it becomes a zoom magnifying power corresponding to an operation with respect to the zoom operation unit, and the optical zoom magnifying power of the other one of the lenses is controlled so that it follows the changing of the optical zoom magnifying power of the one of the lenses at a predetermined time difference. Thus, the power consumption at the time of zooming can be reduced, and the time difference between the timing of the photographing instruction and the timing of the actual photographing can be shortened.

Also, a third aspect of the invention provides a camera including: plural lenses that are disposed at respectively different positions and image a subject image; plural moving units that respectively correspond to the plural lenses and cause positions of the corresponding lenses to move in an optical axis direction to change optical zoom magnifying power of the corresponding lenses; a zoom operation unit that is operated when changing the zoom magnifying power of the subject image; a photographing operation unit that is operated when executing photographing; and a control unit which, until the photographing operation unit is operated, controls the moving unit corresponding to one of the plural lenses so that the optical zoom magnifying power of that one of the lenses becomes a zoom magnifying power corresponding to an operation with respect to the zoom operation unit, and controls the moving unit corresponding to another one of the lenses so that the optical zoom magnifying power of the other one of the lenses follows the changing of the optical zoom magnifying power of the one of the lenses at a lower speed than the moving speed of the one of the lenses.

According to the camera of the third aspect, the subject image is imaged by plural lenses disposed at respectively different positions. Also, the positions of the lenses are moved in the optical axis direction by the moving units corresponding to the respective plural lenses in order to change the optical zoom magnifying powers of the corresponding lenses.

The moving units correspond to the aforementioned zoom motors, and various moving units can be used therefor as long as they can electrically move the lenses of the present invention in the optical axis direction, such as motors like stepping motors and DC (direct current) motors or solenoids. Also, each of the plural lenses may be configured by simply one lens or by plural lenses. In the case where each lens is configured by plural lenses, the moving units act to cause at least one of the plural lenses in the optical axis direction.

Also, in the camera of the third aspect, when the zoom magnifying power of the subject image is to be changed, the zoom operation unit is operated, and when photographing is to be executed, the photographing operation unit is operated. Namely, the zoom operation unit and the photographing operation unit of the present invention respectively correspond to a zoom switch and a release button usually disposed in cameras provided with a zoom function.

Here, in the camera of the third aspect, until the photographing operation unit is operated, the moving unit corresponding to one of the plural lenses is controlled so that the optical zoom magnifying power of the one of the lenses becomes a zoom magnifying power corresponding to an operation with respect to the zoom operation unit, and the moving unit corresponding to the other one of the lenses is controlled so that the optical zoom magnifying power of the other one of the lenses follows the changing of the optical zoom magnifying power of the one of the lenses at a slower speed than the moving speed of the one of the lenses.

In this manner, according to the camera of the third aspect, until the photographing operation unit is operated, the optical zoom magnifying power of the one of the plural lenses is controlled so that it becomes a zoom magnifying power corresponding to an operation with respect to the zoom operation unit, and the optical zoom magnifying power of the other one of the lenses is controlled so that it follows the changing of the optical zoom magnifying power of the one of the lenses at a lower speed than the moving speed of the one of the lenses. Thus, the power consumption at the time of zooming can be reduced, and the time difference between the timing of the photographing instruction and the timing of the actual photographing can be shortened.

Also, a fourth aspect of the invention provides a camera including: plural lenses that are disposed at respectively different positions and image a subject image; plural moving units that respectively correspond to the plural lenses and cause positions of the corresponding lenses to move in an optical axis direction to change optical zoom magnifying power of the corresponding lenses; a zoom operation unit that is operated when changing the zoom magnifying power of the subject image; a photographing operation unit that is operated when executing photographing; and a control unit which, until the photographing operation unit is operated, conducts electronic zoom processing so that an electronic zoom magnifying power with respect to the subject image imaged by one of the plural lenses becomes a zoom magnifying power corresponding to an operation with respect to the zoom operation unit, controls the corresponding moving unit of the one of the lenses so that the optical zoom magnifying power of the one of the lenses follows the changing of the electronic zoom magnifying power resulting from the electronic zoom processing at a predetermined time difference, and controls the moving unit corresponding to another one of the lenses so that the optical zoom magnifying power of the other one of the lenses follows the changing of the optical zoom magnifying power of the one of the lenses at a predetermined time difference.

According to the camera of the fourth aspect, the subject image is imaged by plural lenses disposed at respectively different positions. Also, the positions of the lenses are moved in the optical axis direction by the moving units corresponding to the respective plural lenses in order to change the optical zoom magnifying powers of the corresponding lenses.

The moving units correspond to the aforementioned zoom motors, and various moving units can be used therefor as long as they can electrically move the lenses of the present invention in the optical axis direction, such as motors like stepping motors and DC (direct current) motors or solenoids. Also, each of the plural lenses may be configured by simply one lens or by plural lenses. In the case where each lens is configured by plural lenses, the moving units act to cause at least one of the plural lenses in the optical axis direction.

Also, in the camera of the fourth aspect, when the zoom magnifying power of the subject image is to be changed, the zoom operation unit is operated, and when photographing is to be executed, the photographing operation unit is operated. Namely, the zoom operation unit and the photographing operation unit of the present invention respectively correspond to a zoom switch and a release button usually disposed in cameras provided with a zoom function.

Here, in the camera of the fourth aspect, until the photographing operation unit is operated, electronic zoom processing is conducted so that the electronic zoom magnifying power with respect to the subject image imaged by one of the plural lenses becomes a zoom magnifying power corresponding to an operation with respect to the zoom operation unit, the corresponding moving unit of the one of the lenses is controlled so that the optical zoom magnifying power of the one of the lenses follows the changing of the electronic zoom magnifying power resulting from the electronic zoom processing at a predetermined time difference, and the moving unit corresponding to the other one of lenses is controlled so that the optical zoom magnifying power of the other one of the lenses follows the changing of the optical zoom magnifying power of the one of the lenses at a predetermined time difference.

In this manner, according to the camera of the fourth aspect, until the photographing operation unit is operated, electronic zoom processing is conducted so that the electronic zoom magnifying power with respect to the subject image imaged by the one of the plural lenses becomes a zoom magnifying power corresponding to an operation with respect to the zoom operation unit, the optical zoom magnifying power of the one of the lenses is controlled so that it follows the changing of the electronic zoom magnifying power resulting from the electronic zoom processing at a predetermined time difference, and the optical zoom magnifying power of the other one of the lenses is controlled so that it follows the changing of the optical zoom magnifying power of the one of the lenses at a predetermined time difference. Thus, the power consumption at the time of zooming can be reduced, and the time difference between the timing of the photographing instruction and the timing of the actual photographing can be shortened.

Moreover, a fifth aspect of the invention provides a camera including: plural lenses that are disposed at respectively different positions and image a subject image; plural moving units that respectively correspond to the plural lenses and cause positions of the corresponding lenses to move in an optical axis direction to change optical zoom magnifying power of the corresponding lenses; a zoom operation unit that is operated when changing the zoom magnifying power of the subject image; a photographing operation unit that is operated when executing photographing; and a control unit which, until the photographing operation unit is operated, conducts electronic zoom processing so that a zoom magnifying power where an electronic zoom magnifying power and the optical zoom magnifying power of one of the lenses are combined with respect to the subject image imaged by the one of the plural lenses becomes a zoom magnifying power corresponding to an operation with respect to the zoom operation unit, controls the corresponding moving unit of the one of the lenses so that the one of the lenses moves at a lower speed than a predetermined moving speed and controls the moving unit corresponding to another one of the lenses to move at a lower speed than a predetermined moving speed of the other one of the lenses so that the optical magnifying power of the other one of the lenses follows the changing of the optical zoom magnifying power of the one of the lenses.

According to the camera of the fifth aspect, the subject image is imaged by plural lenses disposed at respectively different positions. Also, the positions of the lenses are moved in the optical axis direction by the moving units corresponding to the respective plural lenses in order to change the optical zoom magnifying powers of the corresponding lenses.

The moving units correspond to the aforementioned zoom motors, and various moving units can be used therefor as long as they can electrically move the lenses of the present invention in the optical axis direction, such as motors like stepping motors and DC (direct current) motors or solenoids. Also, each of the plural lenses may be configured by simply one lens or by plural lenses. In the case where each lens is configured by plural lenses, the moving units act to cause at least one of the plural lenses in the optical axis direction.

Also, in the camera of the fifth aspect, when the zoom magnifying power of the subject image is to be changed, the zoom operation unit is operated, and when photographing is to be executed, the photographing operation unit is operated. Namely, the zoom operation unit and the photographing operation unit of the present invention respectively correspond to a zoom switch and a release button usually disposed in cameras provided with a zoom function.

Here, in the camera of the fifth aspect, until the photographing operation unit is operated, electronic zoom processing is conducted so that the zoom magnifying power where the electronic zoom magnifying power and the optical zoom magnifying power of the one of the lenses are combined with respect to the subject image imaged by the one of the plural lenses becomes a zoom magnifying power corresponding to an operation with respect to the zoom operation unit, the corresponding moving unit of the one of the lenses is controlled so that the one of the lenses moves at a lower speed than a predetermined moving speed, and the moving unit corresponding to another one of the lenses is controlled to move at a lower speed than a predetermined moving speed of the other one of the lenses so that the optical magnifying power of the other one of the lenses follows the changing of the optical zoom magnifying power of the one of the lenses.

In this manner, according to the camera of the fifth aspect, until the photographing operation unit is operated, electronic zoom processing is conducted so that the zoom magnifying power where the electronic zoom magnifying power and the optical zoom magnifying power of the one of the lenses are combined with respect to the subject image imaged by one of the plural lenses becomes a zoom magnifying power corresponding to an operation with respect to the zoom operation unit, the one of the lenses is controlled so that it moves at a lower speed than a predetermined moving speed, and the other one of the lenses is controlled so that it moves at a lower speed than a predetermined moving speed of the other one of the lenses so that the optical magnifying power of the other one of the lenses follows the changing of the optical zoom magnifying power of the one of the lenses Thus, the power consumption at the time of zooming can be reduced, and the time difference between the timing of the photographing instruction and the timing of the actual photographing can be shortened.

A sixth aspect of the invention provides a zoom control method of a camera provided with plural lenses that are disposed at respectively different positions and image a subject image, plural moving units that respectively correspond to the plural lenses and cause positions of the corresponding lenses to move in an optical axis direction to change optical zoom magnifying power of the corresponding lenses, a zoom operation unit that is operated when changing the zoom magnifying power of the subject image, and a photographing operation unit that is operated when executing photographing, the method including, until the photographing operation unit is operated, controlling the moving unit corresponding to one of the plural lenses so that the optical zoom magnifying power of that one of the lenses becomes a zoom magnifying power corresponding to an operation with respect to the zoom operation unit, and when the photographing operation unit has been operated, controlling the moving unit corresponding to another one of the lenses so that the optical zoom magnifying power of that other one of the lenses becomes a zoom magnifying power corresponding to the operation with respect to the zoom operation unit.

Thus, according to the camera zoom control method of the sixth aspect, the camera can be made to act in the same manner as the invention of the first aspect. Thus, the power consumption at the time of zooming can be reduced, and the time difference between the timing of the photographing instruction and the timing of the actual photographing can be shortened.

Also, a seventh aspect of the invention provides a zoom control method of a camera provided with plural lenses that are disposed at respectively different positions and image a subject image, plural moving units that respectively correspond to the plural lenses and cause positions of the corresponding lenses to move in an optical axis direction to change optical zoom magnifying power of the corresponding lenses, a zoom operation unit that is operated when changing the zoom magnifying power of the subject image, and a photographing operation unit that is operated when executing photographing, the method including, until the photographing operation unit is operated, controlling the moving unit corresponding to one of the plural lenses so that the optical zoom magnifying power of the one of the lenses becomes a zoom magnifying power corresponding to an operation with respect to the zoom operation unit, and controlling the moving unit corresponding to another one of the lenses so that the optical zoom magnifying power of the other one of the lenses follows the changing of the optical zoom magnifying power of the one of the lenses at a predetermined time difference.

Thus, according to the camera zoom control method of the seventh aspect, the camera can be made to act in the same manner as the invention of the second aspect. Thus, the power consumption at the time of zooming can be reduced, and the time difference between the timing of the photographing instruction and the timing of the actual photographing can be shortened.

Also, an eighth aspect of the invention provides a zoom control method of a camera provided with plural lenses that are disposed at respectively different positions and image a subject image, plural moving units that respectively correspond to the plural lenses and cause positions of the corresponding lenses to move in an optical axis direction to change optical zoom magnifying power of the corresponding lenses, a zoom operation unit that is operated when changing the zoom magnifying power of the subject image, and a photographing operation unit that is operated when executing photographing, the method including, until the photographing operation unit is operated, controlling the moving unit corresponding to one of the plural lenses so that the optical zoom magnifying power of the one of the lenses becomes a zoom magnifying power corresponding to an operation with respect to the zoom operation unit, and controlling the moving unit corresponding to another one of the lenses so that the optical zoom magnifying power of the other one of the lenses follows the changing of the optical zoom magnifying power of the one of the lenses at a lower speed than the moving speed of the one of the lenses.

Thus, according to the camera zoom control method of the eighth aspect, the camera can be made to act in the same manner as the invention of the third aspect. Thus, the power consumption at the time of zooming can be reduced, and the time difference between the timing of the photographing instruction and the timing of the actual photographing can be shortened.

Also, a ninth aspect of the invention provides a zoom control method of a camera provided with plural lenses that are disposed at respectively different positions and image a subject image, plural moving units that respectively correspond to the plural lenses and cause positions of the corresponding lenses to move in an optical axis direction to change optical zoom magnifying power of the corresponding lenses, a zoom operation unit that is operated when changing the zoom magnifying power of the subject image, and a photographing operation unit that is operated when executing photographing, the method including, until the photographing operation unit is operated, conducting electronic zoom processing so that the electronic zoom magnifying power with respect to the subject image imaged by one of the plural lenses becomes a zoom magnifying power corresponding to an operation with respect to the zoom operation unit, controlling the corresponding moving unit of the one of the lenses so that the optical zoom magnifying power of the one of the lenses follows the changing of the electronic zoom magnifying power resulting from the electronic zoom processing at a predetermined time difference, and controlling the moving unit corresponding to another one of the lenses so that the optical zoom magnifying power of the other one of the lenses follows the changing of the optical zoom magnifying power of the one of the lenses at a predetermined time difference.

Thus, according to the camera zoom control method of the ninth aspect, the camera can be made to act in the same manner as the invention of the fourth aspect. Thus, the power consumption at the time of zooming can be reduced, and the time difference between the timing of the photographing instruction and the timing of the actual photographing can be shortened.

Moreover, a tenth aspect of the invention provides a zoom control method of a camera provided with plural lenses that are disposed at respectively different positions and image a subject image, plural moving units that respectively correspond to the plural lenses and cause positions of the corresponding lenses to move in an optical axis direction to change optical zoom magnifying power of the corresponding lenses, a zoom operation unit that is operated when changing the zoom magnifying power of the subject image, and a photographing operation unit that is operated when executing photographing, the method including, until the photographing operation unit is operated, conducting electronic zoom processing so that the zoom magnifying power where the electronic zoom magnifying power with respect to the subject image imaged by one of the plural lenses and the optical zoom magnifying power of the one of the lenses are combined becomes a zoom magnifying power corresponding to an operation with respect to the zoom operation unit, controlling the corresponding moving unit so that the one of the lenses moves at a lower speed than usual and controlling the moving unit corresponding to the other group of lenses to move at a lower speed than the usual moving speed of the other group of lenses so that the optical magnifying power of the other groups of lenses follows the changing of the optical zoom magnifying power of the one of the lenses.

Thus, according to the camera zoom control method of the tenth aspect, the camera can be made to act in the same manner as the invention of the fifth aspect. Thus, the power consumption at the time of zooming can be reduced, and the time difference between the timing of the photographing instruction and the timing of the actual photographing can be shortened.

According to the camera of the first aspect and the camera zoom control method of the sixth aspect, until the photographing operation unit is operated, the optical zoom magnifying power of the one of the plural lenses is controlled so that it becomes a zoom magnifying power corresponding to an operation with respect to the zoom operation unit, and when the photographing operation unit has been operated, the optical zoom magnifying power of the other one of the lenses is controlled so that it becomes a zoom magnifying power corresponding to the operation with respect to the zoom operation unit. Thus, the power consumption at the time of zooming can be reduced, and the time difference between the timing of the photographing instruction and the timing of the actual photographing can be shortened.

Also, according to the camera of the second aspect and the camera zoom control method of the seventh aspect, until the photographing operation unit is operated, the optical zoom magnifying power of the one of the plural lenses is controlled so that it becomes a zoom magnifying power corresponding to an operation with respect to the zoom operation unit, and the optical zoom magnifying power of the other one of the lenses is controlled so that it follows the changing of the optical zoom magnifying power of the one of the lenses at a predetermined time difference. Thus, the power consumption at the time of zooming can be reduced, and the time difference between the timing of the photographing instruction and the timing of the actual photographing can be shortened.

Also, according to the camera of the third aspect and the camera zoom control method of the eighth aspect, until the photographing operation unit is operated, the optical zoom magnifying power of the one of the plural lenses is controlled so that it becomes a zoom magnifying power corresponding to an operation with respect to the zoom operation unit, and the optical zoom magnifying power of the other one of the lenses is controlled so that it follows the changing of the optical zoom magnifying power of the one of the lenses at a lower speed than the moving speed of the one of the lenses. Thus, the power consumption at the time of zooming can be reduced, and the time difference between the timing of the photographing instruction and the timing of the actual photographing can be shortened.

Also, according to the camera of the fourth aspect and the camera zoom control method of the ninth aspect, until the photographing operation unit is operated, electronic zoom processing is conducted so that the electronic zoom magnifying power with respect to the subject image imaged by one of the plural lenses becomes a zoom magnifying power corresponding to an operation with respect to the zoom operation unit, the optical zoom magnifying power of the one of the lenses is controlled so that it follows the changing of the electronic zoom magnifying power resulting from the electronic zoom processing at a predetermined time difference, and the optical zoom magnifying power of the other one of the lenses is controlled so that it follows the changing of the optical zoom magnifying power of the one of the lenses at a predetermined time difference. Thus, the power consumption at the time of zooming can be reduced, and the time difference between the timing of the photographing instruction and the timing of the actual photographing can be shortened.

Moreover, according to the camera of the fifth aspect and the camera zoom control method of the tenth aspect, until the photographing operation unit is operated, electronic zoom processing is conducted so that the zoom magnifying power with respect to the subject image imaged by one of the plural lenses, where the electronic zoom magnifying power and the optical zoom magnifying power of the one of the lenses are combined, becomes a zoom magnifying power corresponding to an operation with respect to the zoom operation unit, the one of the lenses is controlled so that it moves at a lower speed than usual (a predetermined speed), and the other one of the lenses is controlled so that it moves at a lower speed than the usual moving speed of the other one of the lenses so that the optical magnifying power of the other one of the lenses follows the changing of the optical zoom magnifying power of the one of the lenses. Thus, the power consumption at the time of zooming can be reduced, and the time difference between the timing of the photographing instruction and the timing of the actual photographing can be shortened.

BRIEF DESCRIPTION OF THE DRAWINGS

Embodiments of the invention will be described in detail with reference to the following drawings, wherein:

FIG. 4 is an explanatory diagram for describing a zoom operation in the first embodiment of the invention;

DETAILED DESCRIPTION OF THE INVENTION

Embodiments of the invention will be described in detail below with reference to the drawings. Here, a case will be described where the invention is applied to an electronic digital still camera (referred to below simply as a "digital camera") that is capable of stereo photographing.

First Embodiment

Figure 1:
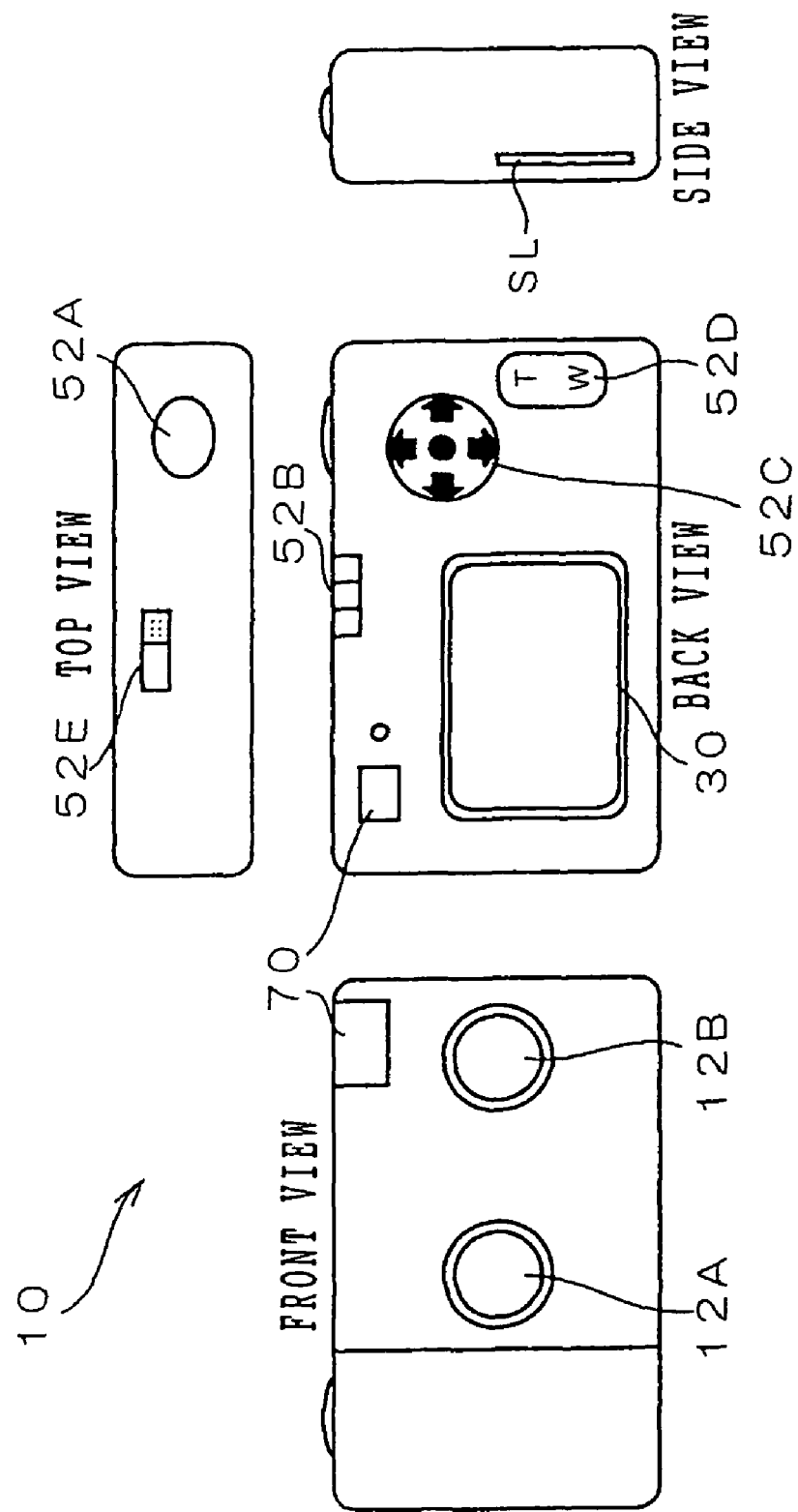
FIG. 1 is an external view showing the exterior of a digital camera 10 pertaining to the embodiments of the invention.

First, with reference to FIG. 1, the configuration of the exterior of a digital camera 10 pertaining to the present embodiment will be described. As shown in FIG. 1, the digital camera 10 includes a front surface provided with a pair of lenses 12A and 12B, which are for imaging a subject image, and a viewfinder 70, which is used in order to determine the composition of the subject to be shot.

The digital camera 10 also includes a top surface provided with a release button (shutter) 52A, which is depressed by the user when executing photographing, and a power switch 52E.

The release button 52A pertaining to the present embodiment is configured so that depression operations of two stages—one where the release button 52A is depressed to an intermediate position (described by "half-depressed" below) and one where the release button 52A is depressed to a final depressed position below the intermediate position (described by "fully depressed" below)—are detectable. Additionally, in the digital camera 10 pertaining to the present embodiment, an AE (Automatic Exposure) function is operated and the exposure status (shutter speed, aperture status) is set by half-depressing the release button 52A. Thereafter, an AF (Auto Focus) function is operated and focusing is controlled, and then exposure (photographing) is conducted when the release button 52A is fully depressed.

The digital camera 10 also includes a back surface provided with an eyepiece portion of the viewfinder 70; a liquid crystal display (called an "LCD" below) 30 for displaying messages, various kinds of menu screens and subject images represented by digital image data obtained by photographing; a mode switching switch 52B that is operated in order to set the photographing mode to any of a stereo photographing mode, which is a mode for conducting three-dimensional stereo photographing, an ordinary photographing mode, which is a mode for conducting ordinary two-dimensional photographing, and a playback mode, which is a mode for displaying (playing back), on the LCD 30, subject images represented by the digital image data obtained by photographing; a cross-shaped cursor button 52C; and a zoom switch 52D that is operated when conducting zooming (magnification and reduction) of a subject image at the time of photographing.

The cross-shaped cursor button 52C is configured by a total of five keys: four arrow keys representing moving directions of the four directions of up, down, left and right in the display region of the LCD 30 and a determination key disposed in the center of the four arrow keys. The zoom switch 52D is configured by a telephoto switch, which corresponds to the position of "T" in FIG. 1 and is operated when magnifying the subject image, and a wide switch, which corresponds to the position of "W" in FIG. 1 and is operated when reducing the subject image.

A slot SL, into which can be loaded a recording medium (here, a recording medium in which the digital image data are recorded as image files) capable of recording digital image data obtained by photographing, is disposed in a side surface of the digital camera 10.

Next, the main components of an electrical system of the digital camera 10 pertaining to the present embodiment will be described with reference to FIG. 2.

Figure 2:
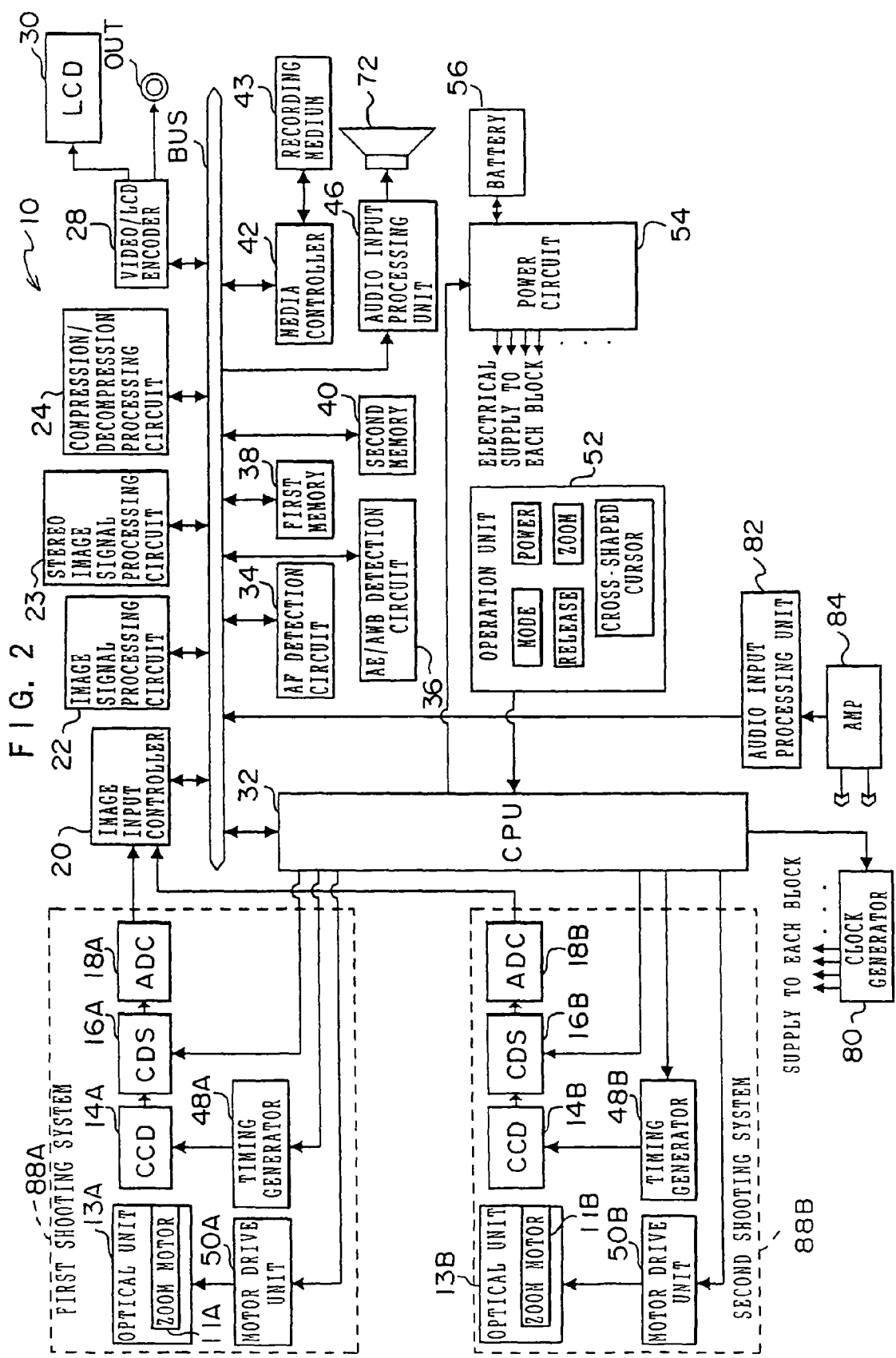
FIG. 2 is a block diagram showing the main components of an electrical system of the digital camera 10 pertaining to the embodiments of the invention.

As shown in FIG. 2, the digital camera 10 includes a first imaging system 88A that is configured by an optical unit 13A including the lens 12A, a CCD (Charge Coupled Device) 14A disposed rearward of the optical axis of the lens 12A, a correlated double sampling circuit (called a "CDS" below) 16A and an analog/digital converter (called an "ADC" below) 18A that converts inputted analog signals into digital data. The digital camera 10 also includes a second imaging system 88B that is configured by an optical unit 13B including the lens 12B, a CCD 14B disposed rearward of the optical axis of the lens 12B, a CDS 16B and an ADC 18B.

Namely, the digital camera 10 pertaining to the present embodiment is provided with two imaging systems—the first imaging system 88A and the second imaging system 88B—whose configurations are mutually identical. Stereo photographing is enabled by using these two imaging systems. When ordinary two-dimensional photographing is to be conducted, one of the first imaging system 88A and the second imaging system 88B is selectively used.

In the first imaging system 88A, an output end of the CCD 14A is connected to an input end of the CDS 16A, and an output end of the CDS 16A is connected to an input end of the ADC 18A. Similarly, in the second imaging system 88B, an output end of the CCD 14B is connected to an input end of the CDS 16B, and an output end of the CDS 16B is connected to an input end of the ADC 18B.

Here, the correlated double sampling processing executed by the CDS 16A and the CDS 16B is processing for obtaining precise pixel data by taking the difference between a pixel signal component level and a feed-through component level included in per-pixel output signals of solid photographing elements with the purpose of reducing noise (particularly thermal noise) included in the output signals of the solid photographing elements.

The digital camera 10 also includes: an image input controller 20 that includes input ends connected to output ends of the ADC 18A and the ADC 18B, is provided with a line buffer of a predetermined capacity, and conducts control for directly storing, in a predetermined region of a later-described second memory 40, inputted digital image data; an image signal processing circuit 22 that conducts various kinds of image processing with respect to digital image data acquired by any one of the first imaging system 88A and the second imaging system 88B that is applied when the ordinary photographing mode is set; a stereo image signal processing circuit 23 that conducts various kinds of image processing with respect to, and synthesizes, two groups of digital image data acquired by both the first imaging system 88A and the second imaging system 88B when the stereo photographing mode is set; a compression/decompression processing circuit 24 that conducts compression processing with respect to digital image data in a predetermined compression format and conducts decompression processing with respect to the compressed digital image data in a format corresponding to the compression format; and a video/LCD encoder 28 that generates a signal for causing menu screens and images represented by digital image data to be displayed on the LCD 30 and supplies this signal to the LCD 30, and which generates an image signal (in the present embodiment, an NTSC signal) representing the image to be displayed on the LCD 30 and outputs this image signal to a video output terminal OUT.

The digital camera 10 also includes: a CPU (central processing unit) 32 that controls the operation of the entire digital camera 10; an AF detection circuit 34 that detects the physical quantity necessary in order to cause the AF function to operate (in the present embodiment, the contrast value of the image obtained by photographing with at least one of the CCD 14A and the CCD 14B being used for photographing); an AE/AWB detection circuit 36 that detects the physical quantity necessary for causing the AE function and the AWB (Automatic White Balance) function to operate (in the present embodiment, the quantity representing the brightness of the image obtained by photographing with at least one of the CCD 14A and the CCD 14B being used for photographing (called "photometric data" below)); a first memory 38 configured by a SDRAM (Synchronous Dynamic Random Access Memory) used as a work area at the time the CPU 32 executes various kinds of processing; and the second memory 40 configured by a VRAM (Video RAM) that stores mainly digital image data obtained by photographing.

Moreover, the digital camera 10 also includes: a media controller 42 for enabling the digital camera 10 to access a recording medium 43 loaded in the slot SL; a speaker 72; an audio output processing unit 46 that conducts processing for outputting audio information to the outside; and an audio input processing unit 82 that conducts processing such as converting, to digital audio data that can be handled in the digital camera 10, analog signals representing audio information inputted via a two system disposed microphones (stereo microphones) and amp 84.

The image input controller 20, the image signal processing circuit 22, the stereo image signal processing circuit 23, the compression/decompression processing circuit 24, the video/LCD encoder 28, the CPU 32, the AF detection circuit 34, the AE/AWB detection circuit 36, the first memory 38, the second memory 40, the media controller 42, the audio output processing unit 46 and the audio input processing unit 82 are all interconnected via a system bus BUS.

Thus, the CPU 32 can: control the operations of each of the image input controller 20, the image signal processing circuit 22, the stereo image signal processing circuit 23, the compression/decompression circuit 24 and the video/LCD encoder 28; acquire the physical quantities detected by the AF detection circuit 34 and the AE/AWB detection circuit 36; access the first memory 38, the second memory 40 and the recording medium 43; output audio information by the speaker 72 via the audio output processing unit 46; and input audio information via the microphone, the amp 84 and the audio input processing unit 82.

A timing generator 48A that mainly generates a timing signal for driving the CCD 14A and supplies the timing signal to the CCD 14A is disposed in the first imaging system 88A. An input end of the timing generator 48A is connected to the CPU 32, and an output end of the timing generator 48A is connected to the CCD 14A. The drive of the CCD 14A is controlled by the CPU 32 via the timing generator 48A.

Moreover, the CPU 32 is connected to an input end of a motor drive unit 50 disposed in the first imaging system 88A. An output end of the motor drive unit 50 is connected to a focal point adjustment motor, a zoom motor 11A and an aperture drive motor disposed in the optical unit 13A. In FIG.

2, only the zoom motor 11A relating to the present invention is shown, and the focal point adjustment motor and the aperture drive motor are omitted.

Namely, the lens 12A included in the optical unit 13A pertaining to the present embodiment includes plural lenses, is configured as a zoom lens whose focal length can be changed (whose power can be changed), and is provided with an unillustrated lens drive mechanism. The focal point adjustment motor, the zoom motor 11A and the aperture drive motor are included in this lens drive mechanism, and the focal point adjustment motor, the zoom motor 11A and the aperture drive motor are respectively driven by drive signals supplied from the motor drive unit 50A under the control of the CPU 32.

When the optical zoom magnifying power is to be changed, the CPU 32 controls the drive of the zoom motor 11A to change the focal length of the lens included in the optical unit 13A. In order to be able to identify the position of the site moved by the zoom motor 11A, the lens drive mechanism is provided with a photo interrupter, which detects the fact that the site is positioned in the home position, and a pulse encoder for detecting the number of revolutions of the zoom motor 11A. The CPU 32 can always grasp the focal length of the lens 12A on the basis of output signals from the photo interrupter and the pulse encoder.

The CPU 32 also conducts focus control by controlling the drive of the focal point adjustment motor so that the contrast of the image obtained by photographing with the CCD 14A becomes the greatest. Namely, in the digital camera 10 pertaining to the present embodiment, the so-called TTL (Through The Lens) format, which sets the position of the lens so that the contrast of the read image becomes the greatest, is adopted as the focus control.

The second imaging system 88B is provided with a timing generator 48B and a motor drive unit 50B that have the same configuration as those of the first imaging system 88A. Similar to the first imaging system 88A, the drive of the CCD 14B, and the drive of a focal point adjustment motor, a zoom motor 11B and an aperture drive motor included in an unillustrated lens drive mechanism disposed in the optical unit 13B, are controlled by the CPU 32 via the timing generator 48B and the motor drive unit 50B.

Moreover, the various kinds of buttons and switches comprising the release button 52A, the mode switching switch 52B, the cross-shaped cursor button 52C, the zoom switch 52D and the power switch 52E (all of which are collectively named "operation unit 52" in FIG. 2) are connected to the CPU 32. The CPU 32 can always grasp the operation status with respect to these buttons and switches.

The digital camera 10 pertaining to the present embodiment is provided with a power circuit 54 and a battery 56. The power circuit 54 generates, under the control of the CPU 32, appropriate operation-use power on the basis of the power inputted from the battery 56, and supplies this power to each part. In order to avoid complication, the illustration of lines connected to each part to which the power is supplied from the power circuit 54 has been omitted from FIG. 2.

Moreover, the digital camera 10 pertaining to the present embodiment is provided with a clock generator 80. The clock generator 80 generates an appropriate clock signal under the control of the CPU 32 and supplies this clock signal to each part. In order to avoid complication, the illustration of lines connected to each part to which the clock signals are supplied from the clock generator 80 has been omitted from FIG. 2.

Next, the action of the digital camera 10 pertaining to the present embodiment will be described. First, the overall operation of the digital camera 10 at the time of stereo photographing will be described.

First, in the first imaging system 88A, photographing via the optical unit 13A of the subject image by the CCD 14A is conducted, and signals representing the subject image are sequentially outputted from the CCD 14A to the CDS 16A.

The CDS 16A conducts correlated double sampling processing with respect to the signals inputted from the CCD 14A, and sequentially outputs, to the ADC 18A, analog image signals of R (red), G (green) and B (blue) obtained by the correlated double sampling processing.

Then, the ADC 18A converts, to 12 bit R, G and B signals (digital image data), the analog image signals of R, G and B inputted from the CDS 16A, and outputs the digital image data to the image input controller 20.

In the second imaging system 88B also, parallel to the operation of the first imaging system 88A, photographing via the optical unit 13B of the subject image by the CCD 14B is conducted, signals representing the subject image are sequentially outputted from the CCD 14B to the CDS 16B, the CDS 16B conducts correlated double sampling processing with respect to the signals inputted from the CCD 14B and sequentially outputs, to the ADC 18B, analog image signals of R, G and B obtained by the correlated double sampling, and the ADC 18B converts, to 12 bit R, G and B signals (digital image data), the analog image signals of R, G and B inputted from the CDS 16B, and outputs the digital image data to the image input controller 20.

The image input controller 20 accumulates, in the line buffer disposed therein, the digital image data of the two images sequentially inputted from the ADC 18A and the ADC 18B, and temporarily stores the digital image data in a predetermined region of the second memory 40.

The digital image data of the two images stored in the predetermined region of the second memory 40 are read by the stereo image signal processing circuit 23 under the control of the CPU 32. The digital image data are processed with a digital gain corresponding to the physical quantity (photometric data) detected by the AE/AWB detection circuit 36, so that white balance adjustment is conducted, gamma processing and sharpness processing are conducted, 8 bit digital image data are generated, YC signal processing is conducted, brightness and chroma signals Y and Cr and Cb (called a "YC signal" below) are generated, these YC signals of the two images are synthesized, a YC signal representing a stereo image is generated, and the YC signal is stored in a region of the second memory 40 that is different from the predetermined region.

Here, the stereo image signal processing circuit 23 recognizes, as YC signals representing a right-use and a left-use image, the YC signals obtained by the first imaging system 88A and the second imaging system 88B, and a generates a YC signal representing a stereo image on the basis of the YC signals of the two images.

The LCD 30 is configured so that it can be used as a finder to display a moving image (through-image) obtained by continuous photographing with the imaging systems, but when the LCD 30 is used as a finder in this manner, of the YC signals representing the stereo image stored in the predetermined region of the second memory 40, only the YC signals obtained by one of the imaging systems are sequentially outputted to the LCD 30 via the video/LCD encoder 28. Thus, the through-image is displayed on the LCD 30.

Here, at the timing when the release button 52A is half-depressed by the user, the AE function operates and the exposure status is set as described above in each imaging system. Then, the AF function operates and the focus is controlled. Thereafter, at the timing when the release button 52A is fully depressed, the YC signals being stored in the second memory 40 at that point in time are compressed in the predetermined compression format (in the present embodiment, the JPEG format) by the compression/decompression processing circuit 24. Thereafter, the YC signals are recorded in the recording medium 43 via the media controller 42.

The operation of the digital camera 10 at the time of photographing in the case where the ordinary photographing mode has been set is substantially the same as the operation in the case where the stereo photographing mode has been set, except that instead of the stereo image signal processing circuit 23, various kinds of image signal processing are conducted by the image signal processing circuit 22 with respect to only the digital image data obtained by a preselected imaging system, YC signals are generated, and the YC signals are stored in the second memory 40. Thus, description here will be omitted.

Figure 3:
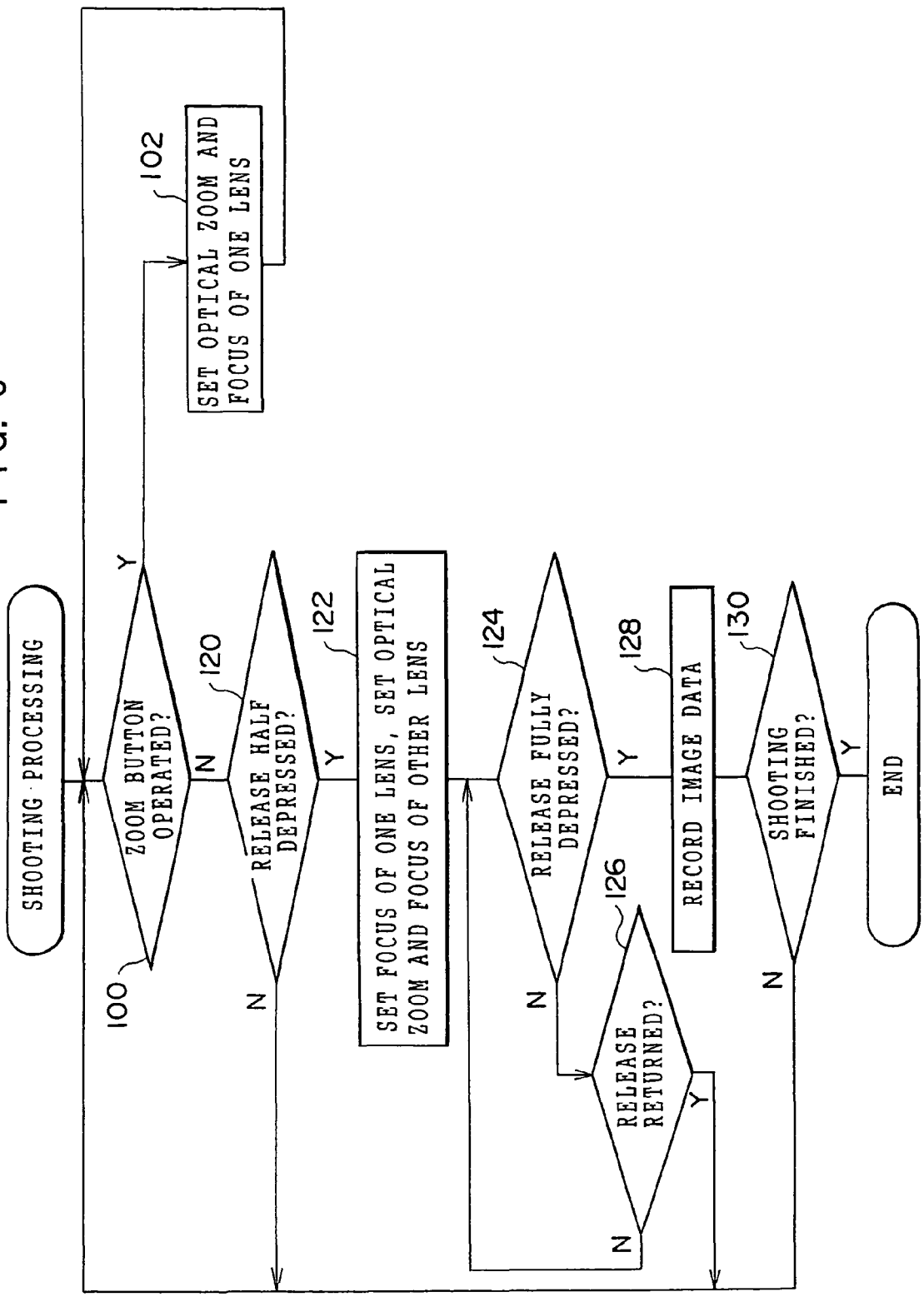
FIG. 3 is a flow chart showing the flow of photographing processing pertaining to a first embodiment of the invention.

Next, with reference to FIGS. 3 and 4, processing of the portion relating particularly to the present invention of the processing executed in the digital camera 10 at the time of stereo photographing will be described in detail. FIG. 3 is a flow chart showing the flow of the portion relating particularly to the present invention of the photographing processing executed by the CPU 32 of the digital camera 10 in the case where the stereo photographing mode has been set by the mode switching switch 52B. FIG. 4 is an explanatory diagram showing an example of the transition of the zoom status and the focus status resulting from execution of the photographing processing. Moreover, here, in order to avoid complication, description in regard to the overall operation of the digital camera 10 that was described previously will be omitted as much as possible.

In step 100 of FIG. 3, it is determined whether or not the zoom switch 52D is being depressed. When the determination is affirmative, the processing moves to step 102, where the zoom motor 11A disposed in the optical unit 13A is controlled via the motor drive unit 50A so that the optical zoom magnifying power of one of the lenses (in the present embodiment, the lens 12A) is changed by a predetermined magnifying power in accordance with the operation with respect to the zoom switch 52D in a predetermined optical zoom magnifying power settable range (in the present embodiment, 1.0 times to 3.0 times).

Also, in step 102, focus control of the lens 12A is conducted in accompaniment with the changing of the optical zoom magnifying power of the lens 12A, and thereafter the processing returns to step 100.

In the control of the zoom motor 11A in step 102, when the telephoto switch of the zoom switch 52D is being depressed, the zoom motor 11A is controlled so that the optical zoom magnifying power becomes a magnifying power obtained by adding a predetermined magnifying power (in the present embodiment, 0.1 times) to the zoom magnifying power at that point in time, and when the wide switch of the zoom switch 52D is being depressed, the zoom motor 11A is controlled so that the optical zoom magnifying power becomes a magnifying power obtained by subtracting a predetermined magnifying power (in the present embodiment, 0.1 times) from the zoom magnifying power at that point in time. Also, when the processing returns to step 100, the CPU 32 stores, in a predetermined region of the first memory 38, the focal length of the lens 12A obtained on the basis of the output signals from the photo interrupter and the pulse encoder included in the unillustrated lens drive mechanism.

When the determination in step 100 is negative, i.e., when the zoom switch 52D is not being depressed, the processing moves to step 120, where it is determined whether or not the release button 52A has been half-depressed. When the determination is negative, the processing returns to step 100, and when the determination is affirmative, the processing moves to step 122.

In step 122, focus control of the lens serving as the control target in step 102 (the lens 12A) is conducted, and the zoom motor 11B disposed in the optical unit 13B is controlled via the motor drive unit 50B so that the optical zoom magnifying power of the other lens (the lens 12B) becomes a magnifying power corresponding to the focal length finally stored in the first memory 38 by the processing of step 102.

Also, in step 122, focus control of the lens 12B is conducted in accompaniment with the changing of the optical zoom magnifying power of the lens 12B, and thereafter the processing moves to step 124.

In step 124, it is determined whether or not the release button 52A has been fully depressed. When the determination is negative, the processing moves to step 126, where it is determined whether or not the release button 52A has returned to the undepressed position. When the determination is negative, the processing returns to step 124, and when the determination is affirmative, the processing returns to step 100. When the determination is affirmative in step 124, the processing moves to step 128.

Due to the repeated processing of steps 100 to 126, during the time that the zoom button 52D is being operated by the user, display of the subject image in the zoom magnifying power corresponding to the operation with respect to the zoom switch 52D is conducted on the LCD 30 by the processing of steps 100 to 102, and at the point in time when the release button 52A has been half-depressed by the user, the optical zoom magnifying power of the lens 12B is set to become a zoom magnifying power set in accordance with the operation by the zoom switch 52D at that point in time, and focus control of both lenses is conducted.

Then, when the release button 52A is returned from the half-depressed state to the undepressed position without being fully depressed, it is regarded that photographing in this state will not be conducted, the processing returns to step 100, and depression of the zoom switch 52D or the release button 52A is again waited upon. When the release button 52A is fully depressed after having been half-depressed, it is regarded that photographing will be conducted, and the processing moves to step 128.

In step 128, the YC signals representing the stereo image being recorded in the second memory 40 at that point in time are compressed in the predetermined compression format (in the present embodiment, the JPEG format) by the compression/decompression processing circuit 24, and then the image data are recorded in the recording medium 43 via the media controller 42. In step 130, whether or not the photographing processing has ended is determined by determining whether or not the setting resulting from the mode switching switch 52B has moved to another mode. When the determination is negative, the processing returns to step 100, and the photographing processing ends at the point in time when the determination is affirmative.

According to this photographing processing, as shown in FIG. 4 as an example, until the release button 52A is half-depressed, the zoom motor 11A corresponding to the lens 12A is controlled so that the optical zoom magnifying power of the lens 12A (indicated by "L side" in FIG. 4) becomes a zoom magnifying power corresponding to the operation with respect to the zoom switch 52D, and focus control of the lens 12A is conducted in accompaniment with the changing of the optical zoom magnifying power of the lens 12A.

In this manner, in the digital camera 10 pertaining to the present embodiment, changing of the zoom magnifying power of the lens 12B (indicated by "R side" in FIG. 4) is not conducted until the release button 52A is half-depressed, whereby the power consumption can be reduced by that much.

When the release button 52A has been half-depressed, focus control of the lens 12A is conducted, the zoom motor 11B corresponding to the lens 12B is controlled so that the optical zoom magnifying power of the lens 12B becomes the final optical zoom magnifying power set by the lens 12A in accordance with the zoom operation by the user, focus control of the lens 12B is conducted in accompaniment with the changing of the optical zoom magnifying power of the lens 12B, and thereafter photographing is conducted at the point in time when the release button 52A is fully depressed.

In this manner, the digital camera 10 pertaining to the present embodiment is configured so that when the release button 52A is half-depressed, the optical zoom magnifying power of the lens 12B is changed to become the final zoom magnifying power corresponding to the zoom operation by the user. Thus, the power consumed for the changing is little in comparison to power consumption relating to the lens 12B in the case where the optical zoom magnifying powers of both lenses are changed at the time of the zoom operation. As a result, the overall power consumption at the time of zooming can be reduced.

Also, at this time, it suffices for the CPU 32 to conduct control for setting the optical zoom magnifying power with respect to only the lens 12B. Thus, the control load of the CPU 32 at the time of photographing can be reduced in comparison to conventional technology where electronic zoom processing is conducted with respect to digital image data obtained by both lenses prior to photographing and the optical zoom magnifying powers of both lenses are set to final values at the time of photographing. As a result, the time difference between the timing of the photographing instruction and the timing of the actual photographing can be shortened.

As described in detail above, according to the present embodiment, until the release button 52A is operated, the optical zoom magnifying power of the lens 12A is controlled to become the zoom magnifying power corresponding to the operation with respect to the zoom switch 52D, and when the release button 52A is operated, the optical zoom magnifying power of the lens 12B is controlled to become the zoom magnifying power corresponding to the operation with respect to the zoom switch 52D. Thus, the power consumption at the time of zooming can be reduced, and the time difference between the timing of the photographing instruction and the timing of the actual photographing can be shortened.

In the present embodiment, a case was described where the focal length of the lens serving as the control target (in the present embodiment, the lens 12A) until the release button 52A is operated is sequentially stored in the first memory 38, and where the focal length of the other lens (the lens 12B) is controlled to become the same as the focal length stored in the first memory 38 when the release button 52A is operated, and where the zoom motor corresponding to the other lens is controlled so that the optical zoom magnifying power of the other lens becomes the zoom magnifying power corresponding to the operation with respect to the zoom switch 52D. However, the invention is not limited to this. For example, the invention can also be configured so that, instead of the focal length, the optical zoom magnifying power is stored in the first memory 38 and used to set the optical zoom magnifying power of the other lens. In this case also, effects that are the same as those of the present embodiment can be provided.

Second Embodiment

Next, a second embodiment of the invention will be described. Because the configuration of the digital camera pertaining to the second embodiment is the same as that of the digital camera 10 pertaining to the first embodiment, description here will be omitted.

Figure 5:
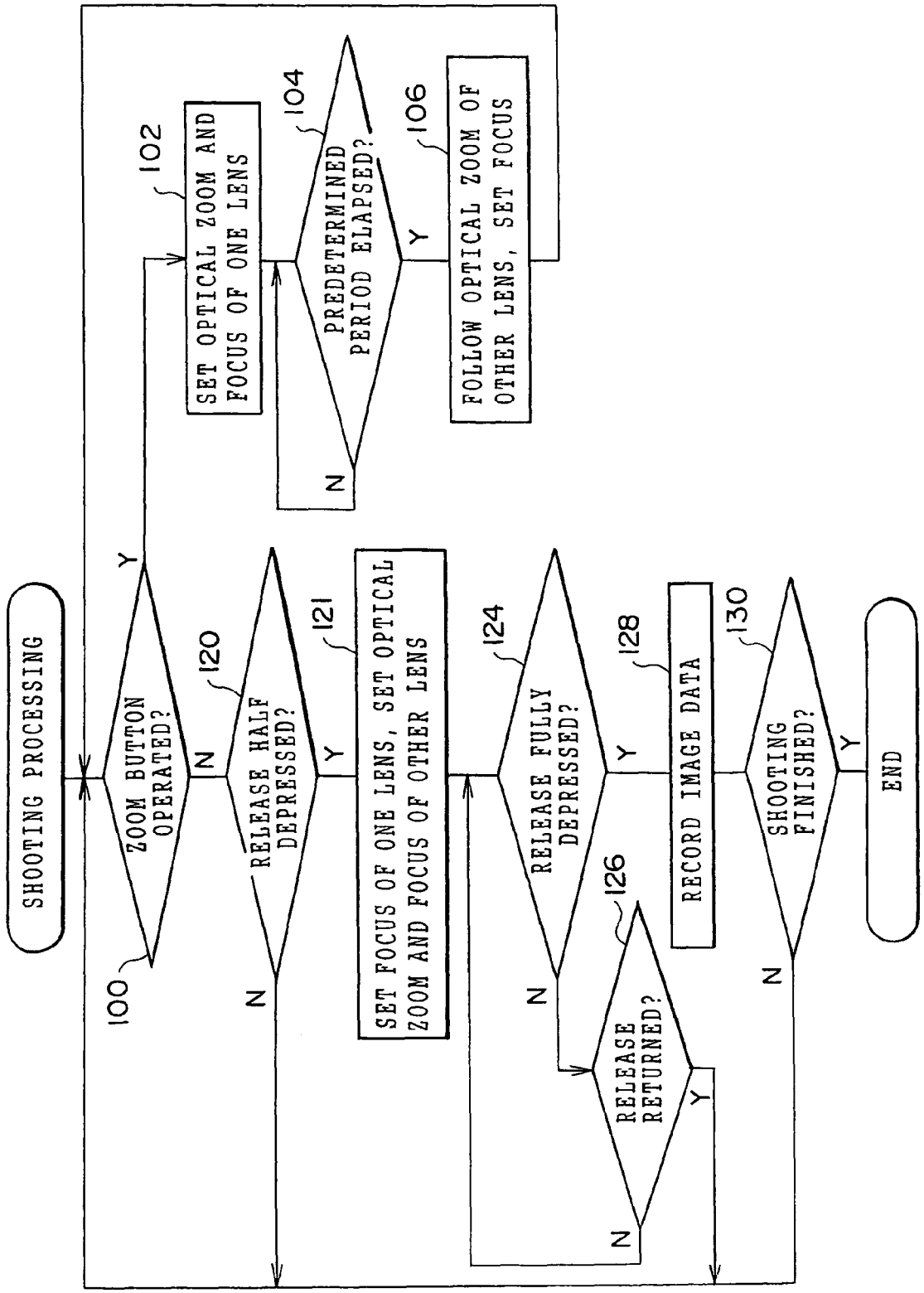
FIG. 5 is a flow chart showing the flow of photographing processing pertaining to a second embodiment of the invention.
Figure 6A:
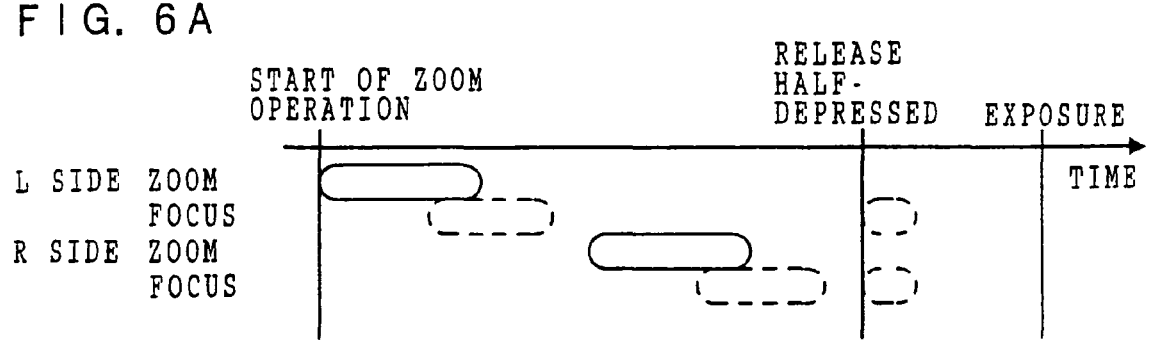
FIGS. 6A and 6B are explanatory diagrams for describing a zoom operation in the second embodiment of the invention.
Figure 6B:
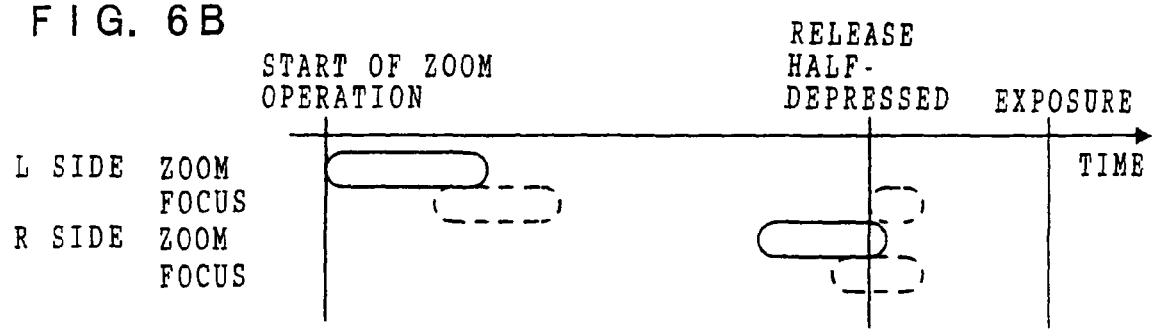

Processing of the portion relating particularly to the present invention of the processing executed in the digital camera 10 pertaining to the second embodiment at the time of stereo photographing will be described below with reference to FIG. 5 and FIGS. 6A and 6B. FIG. 5 is a flow chart showing the flow of the portion relating particularly to the present invention of the photographing processing executed by the CPU 32 of the digital camera 10 in the case where the stereo photographing mode has been set by the mode switching switch 52B. In FIG. 5, the same step numbers as those of FIG. 3 will be given to steps where processing that is the same as that of FIG. 3 is conducted, and description thereof will be omitted. Also, FIGS. 6A and 6B are explanatory diagrams showing an example of the transition of the zoom status and the focus status resulting from execution of the photographing processing.

When the zoom switch 52D has been operated by the user and the processing of step 102 of FIG. 5 ends, the elapse of a predetermined period (in the present embodiment, 1 second) is waited upon in step 104. In step 106, the zoom motor 11B disposed in the optical unit 13B is controlled via the motor drive unit 50B so that the optical zoom magnifying power of the lens not serving as the control target in step 102 (the lens 12B) follows the optical zoom magnifying power of the lens serving as the control target in step 102 (the lens 12A). At this time, the CPU 32 controls the zoom motor 11B so that the optical zoom magnifying power of the lens 12B becomes a magnifying power corresponding to the focal length of the lens 12A stored in the predetermined region of the first memory 38 by the processing of step 102.

Also, in step 106, focus control of the lens 12B is conducted in accompaniment with the changing of the optical zoom magnifying power of the lens 12B, and thereafter the processing returns to step 100.

When the release button 52A is half-depressed by the user, in step 121, focus control of the lens serving as the control target in step 102 (the lens 12A) is conducted, and the zoom motor 11B disposed in the optical unit 13B is controlled via the motor drive unit 50B so that the optical zoom magnifying power of the other lens (the lens 12B) becomes, when it is not the magnifying power corresponding to the focal length finally stored in the first memory 38 by the processing of step 102, that magnifying power.

When the optical zoom magnifying power of the lens 12B is to be changed, the zoom motor 11B is rotatingly driven at a speed that is higher than that of the zoom motor 11A, whereby the optical zoom magnifying power of the lens 12B can be matched at a high speed with that of the lens 12A. As the specific method of realizing this high-speed rotation, when the zoom motor 11A and the zoom motor 11B are DC motors, the voltage level applied to the zoom motor 11B can be made higher than the voltage level applied to the zoom motor 11A, and when the zoom motor 11A and the zoom motor 11B are stepping motors, the pulse rate applied to the zoom motor 11B can be made higher than the pulse rate applied to the zoom motor 11A.

Also, in step 121, focus control of the lens 12B is conducted, and thereafter the processing moves to step 124.

According to this photographing processing, as shown in FIGS. 6A and 6B as an example, until the release button 52A is half-depressed, the zoom motor 11A corresponding to the lens 12A is controlled so that the optical zoom magnifying power of the lens 12A (indicated by "L side" in FIGS. 6A and 6B) becomes a zoom magnifying power corresponding to the operation with respect to the zoom switch 52D, and focus control of the lens 12A is conducted in accompaniment with the changing of the optical zoom magnifying power of the lens 12A.

Also, following the control of the lens 12A at a predetermined time difference, the zoom motor 11B corresponding to the lens 12B is controlled so that the optical zoom magnifying power of the lens 12B (indicated by "R side" in FIGS. 6A and 6B) becomes the same as that of the lens 12A, and focus control of the lens 12B is conducted in accompaniment with the changing of the optical zoom magnifying power of the lens 12B.

In this manner, in the digital camera 10 pertaining to the second embodiment, until the release button 52A is half-depressed, the changing of the optical zoom magnifying power of the lens 12B is conducted so as to follow the changing of the optical zoom magnifying power of the lens 12A after a predetermined period. Thus, in a case where the zoom magnifying power gradually becomes the desired zoom magnifying power due to zoom operations by the user being conducted by repeating magnification and reduction, excessive zoom operation of the lens 12B corresponding to the repeated operations can be suppressed, and the power consumption can be reduced in comparison to the case where the changing of the optical zoom magnifying power of the lens 12B is conducted at the same time as the changing of the optical zoom magnifying power of the lens 12A.

When the release button 52A has been half-depressed, focus control of the lens 12A is conducted, the zoom motor 11B corresponding to the lens 12B is controlled so that the optical zoom magnifying power of the lens 12B becomes, when it is not the final optical zoom magnifying power set by the lens 12A in accordance with the zoom operation by the user, that zoom magnifying power, focus control of the lens 12B is conducted, and thereafter photographing is conducted at the point in time when the release button 52A has been fully depressed.

Namely, when the release button 52A has been half-depressed, as shown in FIG. 6A as an example, the optical zoom magnifying power of the lens 12B is established, or as shown in FIG. 6B as an example, the optical zoom magnifying power of the lens 12B approaches to a certain extent the optical zoom magnifying power of the lens 12A. Thus, the changing period of the optical zoom magnifying power of the lens 12B at the time of photographing can be significantly shortened in comparison to conventional technology where electronic zoom processing is conducted with respect to digital image data obtained by both lenses prior to photographing and the optical zoom magnifying powers of both lenses are set to final values at the time of photographing. As a result, the time difference between the timing of the photographing instruction and the timing of the actual photographing can be significantly shortened.

As described in detail above, according to the present embodiment, until the release button 52A is operated, the optical zoom magnifying power of the lens 12A is controlled to become the zoom magnifying power corresponding to the operation with respect to the zoom switch 52D, and the optical zoom magnifying power of the lens 12B is controlled to follow the changing of the optical zoom magnifying power of the lens 12A at a predetermined time difference. Thus, the power consumption at the time of zooming can be reduced, and the time difference between the timing of the photographing instruction and the timing of the actual photographing can be shortened.

Third Embodiment

Next, a third embodiment of the invention will be described. Because the configuration of the digital camera pertaining to the third embodiment is the same as that of the digital camera 10 pertaining to the first embodiment, description here will be omitted.

Figure 7:
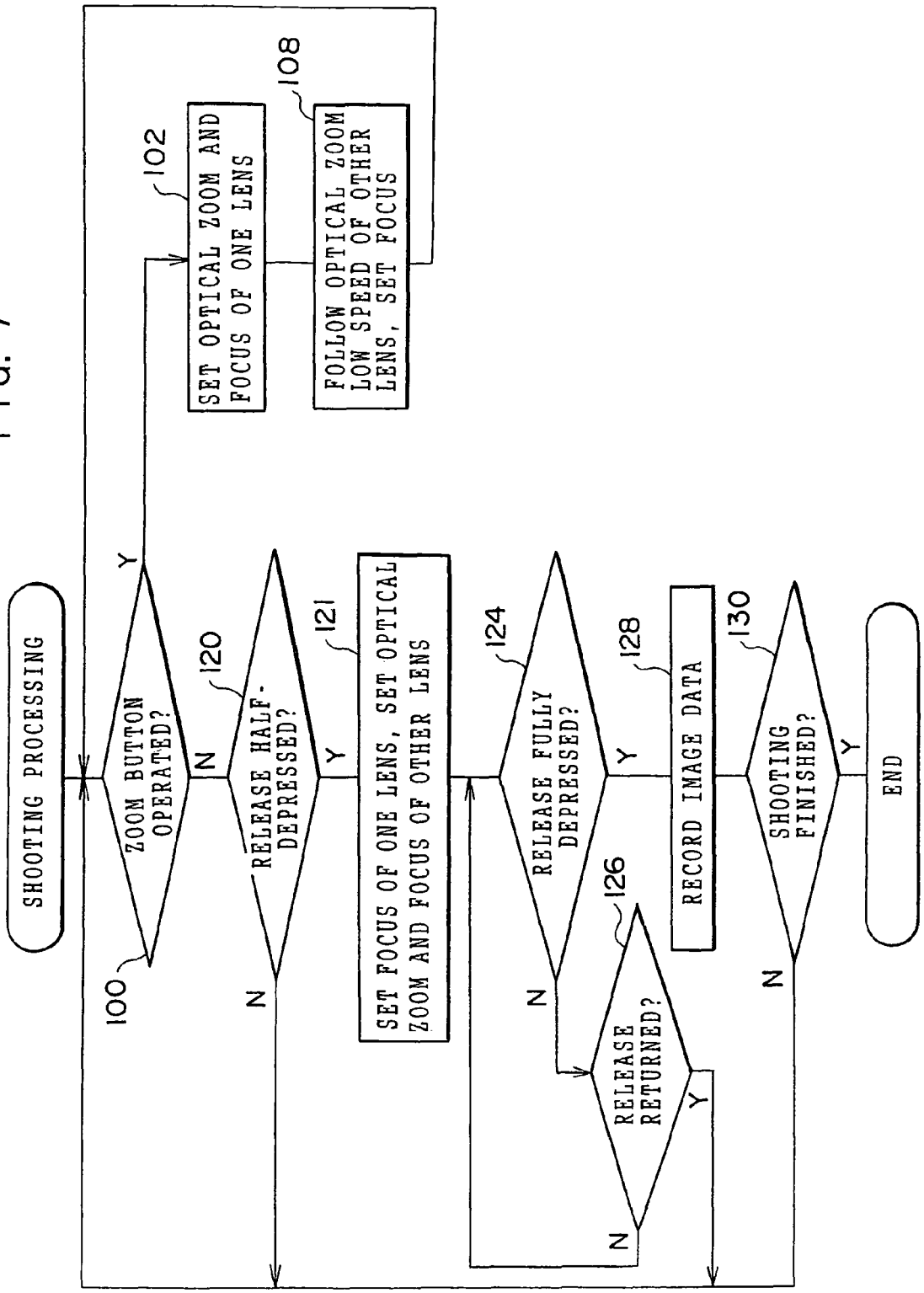
FIG. 7 is a flow chart showing the flow of photographing processing pertaining to a third embodiment of the invention.
Figure 8:
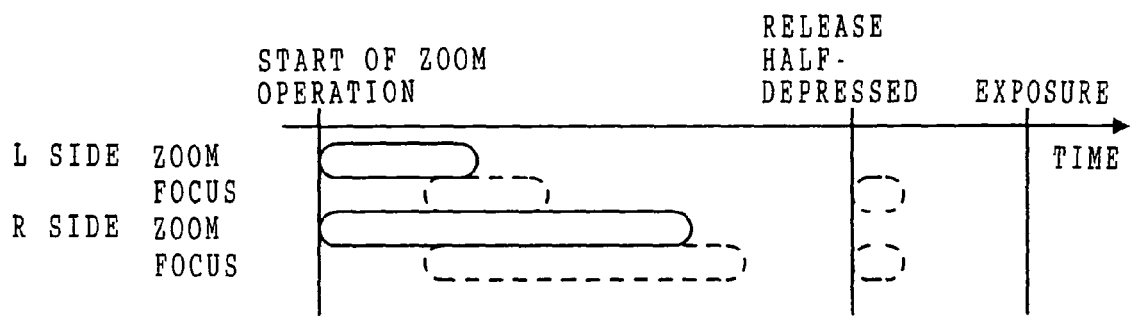
FIG. 8 is an explanatory diagram for describing a zoom operation in the third embodiment of the invention.

Processing of the portion relating particularly to the present invention of the processing executed in the digital camera 10 pertaining to the third embodiment at the time of stereo photographing will be described below with reference to FIGS. 7 and 8. FIG. 7 is a flow chart showing the flow of the portion relating particularly to the present invention of the photographing processing executed by the CPU 32 of the digital camera 10 in the case where the stereo photographing mode has been set by the mode switching switch 52B. In FIG. 7, the same step numbers as those of FIG. 5 will be given to steps where processing that is the same as that of FIG. 5 is conducted, and description thereof will be omitted. Also, FIG. 8 is an explanatory diagram showing an example of the transition of the zoom status and the focus status resulting from execution of the photographing processing.

When the zoom switch 52D has been operated by the user and the processing of step 102 of FIG. 7 ends, in step 108, the zoom motor 11B disposed in the optical unit 13B is controlled via the motor drive unit 50B so that the optical zoom magnifying power of the lens not serving as the control target in step 102 (the lens 12B) follows the optical zoom magnifying power of the lens serving as the control target in step 102 (the lens 12A).

At this time, the CPU 32 rotatingly drives the zoom motor 11B at a lower speed than that of the zoom motor 11A, whereby the optical zoom magnifying power of the lens 12B is changed to a lower speed than that of the lens 12A. As the specific method of realizing this low-speed rotation, when the zoom motor 11A and the zoom motor 11B are DC motors, the voltage level applied to the zoom motor 11B can be made lower than the voltage level applied to the zoom motor 11A, and when the zoom motor 11A and the zoom motor 11B are stepping motors, the pulse rate applied to the zoom motor 11B can be made slower than the pulse rate applied to the zoom motor 11A. Also, at this time, the CPU 32 controls the zoom motor 11B so that the optical zoom magnifying power of the lens 12B becomes the magnifying power corresponding to the focal length of the lens 12A stored in the predetermined region of the first memory 38 by the processing of step 102.

Also, in step 108, focus control of the lens 12B is conducted in accompaniment with the changing of the optical zoom magnifying power of the lens 12B, and thereafter the processing returns to step 100.

According to this photographing processing, as shown in FIG. 8 as an example, until the release button 52A is half-depressed, the zoom motor 11A corresponding to the lens 12A is controlled so that the optical zoom magnifying power of the lens 12A (indicated by "L side" in FIG. 8) becomes a zoom magnifying power corresponding to the operation with respect to the zoom switch 52D, and focus control of the lens 12A is conducted in accompaniment with the changing of the optical zoom magnifying power of the lens 12A.

Also, following the control of the lens 12A, the zoom motor 11B corresponding to the lens 12B is controlled so that the optical zoom magnifying power of the lens 12B (indicated by "R side" in FIG. 8) becomes the same as that of the lens 12A, and focus control of the lens 12B is conducted in accompaniment with the changing of the optical zoom magnifying power of the lens 12B.

Here, the CPU 32 is configured so make the rotational speed of the zoom motor 11B lower than the rotational speed of the zoom motor 11A, so that the consumption of power for rotatingly driving the zoom motor 11B can be reduced in comparison to the case where the zoom motor 11B is rotatingly driven at the same rotational speed as that of the zoom motor 11A.

In the digital camera 10, when the release button 52A has been half-depressed, focus control of the lens 12A is conducted, the zoom motor 11B corresponding to the lens 12B is controlled so that the optical zoom magnifying power of the lens 12B becomes, when it is not the final optical zoom magnifying power set by the lens 12A in accordance with the zoom operation by the user, that zoom magnifying power, focus control of the lens 12B is conducted, and thereafter photographing is conducted at the point in time when the release button 52A has been fully depressed.

Namely, when the release button 52A has been half-depressed, as shown in FIG. 8 as an example, the optical zoom magnifying power of the lens 12B is established or approaches to a certain extent the optical zoom magnifying power of the lens 12A. Thus, the changing period of the optical zoom magnifying power of the lens 12B at the time of photographing can be significantly shortened in comparison to conventional technology where electronic zoom processing is conducted with respect to digital image data obtained by both lenses prior to photographing and the optical zoom magnifying powers of both lenses are set to final values at the time of photographing. As a result, the time difference between the timing of the photographing instruction and the timing of the actual photographing can be significantly shortened.

As described in detail above, according to the present embodiment, until the release button 52A is operated, the optical zoom magnifying power of the lens 12A is controlled to become the zoom magnifying power corresponding to the operation with respect to the zoom switch 52D, and the optical zoom magnifying power of the lens 12B is controlled to follow the changing of the optical zoom magnifying power of the lens 12A at a lower speed than the moving speed of the lens 12A. Thus, the power consumption at the time of zooming can be reduced, and the time difference between the timing of the photographing instruction and the timing of the actual photographing can be shortened.

Fourth Embodiment

Next, a fourth embodiment of the invention will be described. Because the configuration of the digital camera pertaining to the fourth embodiment is the same as that of the digital camera 10 pertaining to the first embodiment, description here will be omitted.

Figure 9:
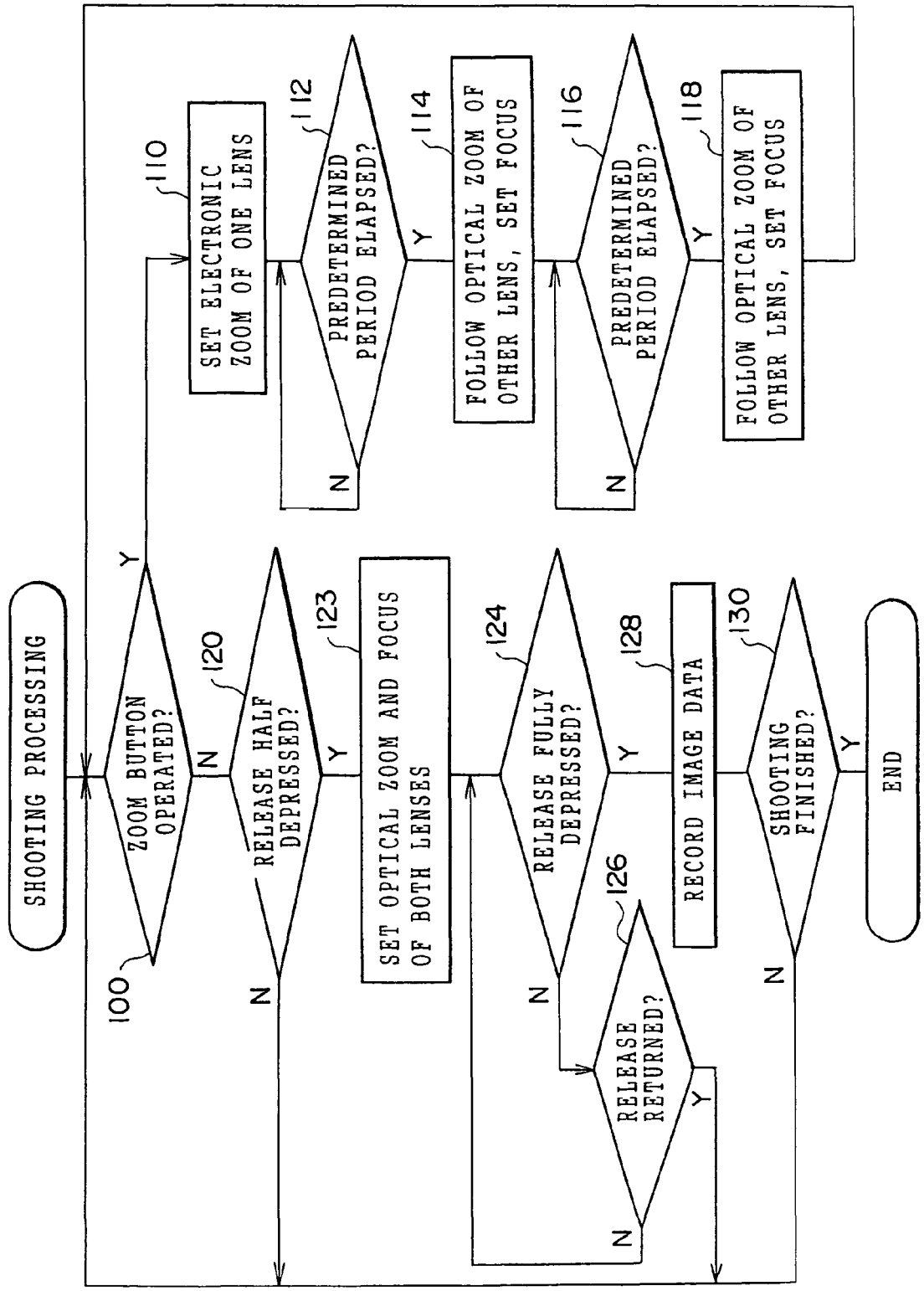
FIG. 9 is a flow chart showing the flow of photographing processing pertaining to a fourth embodiment of the invention.
Figure 10:
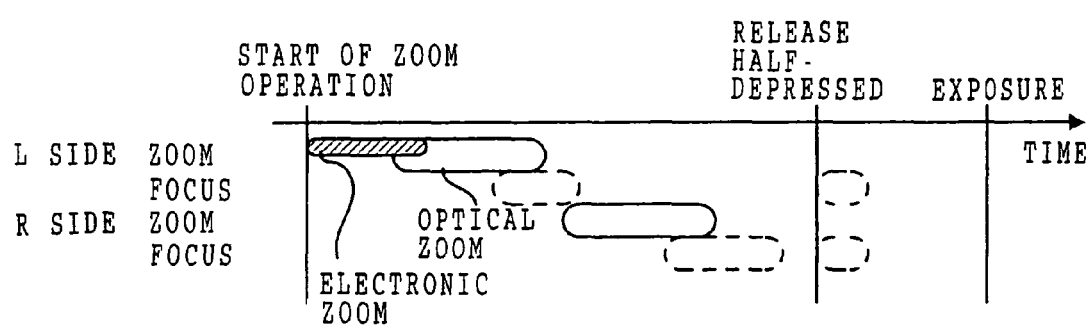
FIG. 10 is an explanatory diagram for describing a zoom operation in the fourth embodiment of the invention.

Processing of the portion relating particularly to the present invention of the processing executed in the digital camera 10 pertaining to the fourth embodiment at the time of stereo photographing will be described below with reference to FIGS. 9 and 10. FIG. 9 is a flow chart showing the flow of the portion relating particularly to the present invention of the photographing processing executed by the CPU 32 of the digital camera 10 in the case where the stereo photographing mode has been set by the mode switching switch 52B. In FIG. 9, the same step numbers as those of FIG. 3 will be given to steps where processing that is the same as that of FIG. 3 is conducted, and description thereof will be omitted. Also, FIG. 10 is an explanatory diagram showing an example of the transition of the zoom status and the focus status resulting from execution of the photographing processing.

When the zoom switch 52D has been operated by the user, in step 110 of FIG. 9, electronic zoom processing with respect to digital image data obtained by one of the lenses (in the present embodiment, the lens 12A) is conducted so that the electronic zoom magnifying power with respect to that digital image data is changed by a predetermined magnifying power in accordance with the operation with respect to the zoom switch 52D.

As for the electronic zoom processing pertaining to the present embodiment, when the electronic zoom magnifying power exceeds 1, the electronic zoom processing is conducted by newly generating, by interpolation processing and in accordance with the size of the zoom magnifying power, image data (digital image data of pixel units) not obtained by photographing with the CCD 14A, and when the electronic zoom magnifying power is less than 1, the electronic zoom processing is conducted by thinning processing of pixel units in accordance with the size of the zoom magnifying power with respect to digital image data obtained by photographing with the CCD 14A.

In step 112, the elapse of a predetermined period (in the present embodiment, 1 second) is waited upon, and in step 114, the zoom motor 11A disposed in the optical unit 13A is controlled via the motor drive unit 50A so that the optical zoom magnifying power of the lens serving as the control target in step 110 (the lens 12A) follows the electronic zoom magnifying power applied in step 110. At this time, the CPU 32 is configured to lower the electronic zoom magnifying power as the optical zoom magnifying power of the lens 12A rises, whereby the total magnifying power of the electronic zoom magnifying power and the optical zoom magnifying power does not change.

Also, in step 114, focus control of the lens 12A is conducted in accompaniment with the changing of the optical zoom magnifying power of the lens 12A, and thereafter the processing moves to step 116.

In step 116, the elapse of a predetermined period (in the present embodiment, 1 second) is waited upon, and in step 118, the zoom motor 11B disposed in the optical unit 13B is controlled via the motor drive unit 50B so that the optical zoom magnifying power of the lens not serving as the control target in step 114 (the lens 12B) follows the optical zoom magnifying power of the lens serving as the control target in step 114 (the lens 12A).

Also, in step 118, focus control of the lens 12B is conducted in accompaniment with the changing of the optical zoom magnifying power of the lens 12B, and thereafter the processing returns to step 100.

When the release button 52A has been half-depressed by the user, in step 123, when at least one of the lens 12A and the lens 12B is not at the final optical zoom magnifying power corresponding to the operation of the zoom switch 52D, the corresponding zoom motor is controlled so that the lens is at the optical zoom magnifying power, and focus control of both lenses is conducted regardless of that control.

When the optical zoom magnifying power of at least one lens is to be changed, the corresponding zoom motor is rotatingly driven at a higher speed than usual to match the optical zoom magnifying power of that lens to the final optical zoom magnifying power at a high speed. As the specific method of realizing this high-speed rotation, when the zoom motor 11A and the zoom motor 11B are DC motors, the voltage level applied to the corresponding zoom motor can be made higher than usual, and when the zoom motor 11A and the zoom motor 11B are stepping motors, the pulse rate applied to the corresponding zoom motor can be made higher than usual.

According to this photographing processing, as shown in FIG. 10 as an example, until the release button 52A is half-depressed, electronic zoom processing is conducted so that the electronic zoom magnifying power with respect to the digital image data acquired by the lens 12A (indicated by "L side" in FIG. 10) becomes the zoom magnifying power corresponding to the operation with respect to the zoom switch 52D, the zoom motor 11A is controlled so that the optical zoom magnifying power of the lens 12A changes following this at a predetermined time difference, and focus control of the lens 12A is conducted in accompaniment with the changing of the optical zoom magnifying power of the lens 12A.

Also, following the control of the lens 12A at the predetermined time difference, the zoom motor 11B is controlled so that the optical zoom magnifying power of the lens 12B (indicated by "R side" in FIG. 10) becomes the same as that of the lens 12A, and focus control of the lens 12B is conducted in accompaniment with the changing of the optical zoom magnifying power of the lens 12B.

In this manner, in the digital camera 10 pertaining to the fourth embodiment, until the release button 52A is half-depressed, the zoom magnifying power is set by electronic zoom processing with respect to the digital image data acquired by the lens 12A, and changing of the optical zoom magnifying power resulting from the lens 12A is conducted to follow this after a predetermined period. Thus, in a case where the zoom magnifying power gradually becomes the desired zoom magnifying power due to zoom operations by the user being conducted by repeating magnification and reduction, excessive zoom operation of the lens 12A corresponding to those repeated operations can be suppressed, and the power consumption can be reduced in comparison to the case where the changing of the zoom magnifying power of the lens 12A is conducted without concomitant use of the electronic zoom processing.

Also, in the digital camera 10 pertaining to the fourth embodiment, until the release button 52A is half-depressed, the changing of the optical zoom magnifying power of the lens 12B is conducted so as to follow, after a predetermined period, the changing of the optical zoom magnifying power of the lens 12A. Thus, in a case where the zoom magnifying power gradually becomes the desired zoom magnifying power due to zoom operations by the user being conducted by repeating magnification and reduction, excessive zoom operation of the lens 12B corresponding to those repeated operations can be suppressed, and the power consumption can be reduced in comparison to the case where the changing of the optical zoom magnifying power of the lens 12B is conducted at the same time as the changing of the optical zoom magnifying power of the lens 12A.

When the release button 52A has been half-depressed, only in the case where at least one of the lens 12A and the lens 12B is not at the final optical zoom magnifying power corresponding to the operation of the zoom switch 52D, the corresponding zoom motor is controlled to be a higher speed than usual so that the lens is at the optical zoom magnifying power, and focus control of both lenses is conducted regardless of that control. In FIG. 10, a case is shown where the optical zoom magnifying powers of both lenses become the final optical zoom magnifying power at the point in time when the release button 52A has been half-depressed.

Namely, when the release button 52A has been half-depressed, the optical zoom magnifying powers of both the lens 12A and the lens 12B at least approach the final optical zoom magnifying power. Thus, the changing period of the optical zoom magnifying powers of the lens 12A and the lens 12B at the time of photographing can be significantly shortened in comparison to conventional technology where electronic zoom processing is conducted with respect to digital image data obtained by both lenses prior to photographing and the optical zoom magnifying powers of both lenses are set to final values at the time of photographing. As a result, the time difference between the timing of the photographing instruction and the timing of the actual photographing can be significantly shortened.

As described in detail above, according to the present embodiment, until the release button 52A is operated, electronic zoom processing is conducted so that the electronic zoom magnifying power with respect to the subject image imaged by the lens 12A becomes the zoom magnifying power corresponding to the operation with respect to the zoom switch 52D, the optical zoom magnifying power of the lens 12A is controlled to follow the changing of the electronic zoom magnifying power resulting from the electronic zoom processing at a predetermined time difference, and the optical zoom magnifying power of the lens 12B is controlled to follow the changing of the optical zoom magnifying power of the lens 12A at a predetermined time difference. Thus, the power consumption at the time of zooming can be reduced, and the time difference between the timing of the photographing instruction and the timing of the actual photographing can be shortened.

Fifth Embodiment

Next, a fifth embodiment of the invention will be described. Because the configuration of the digital camera pertaining to the fifth embodiment is the same as that of the digital camera 10 pertaining to the first embodiment, description here will be omitted.

Figure 11:
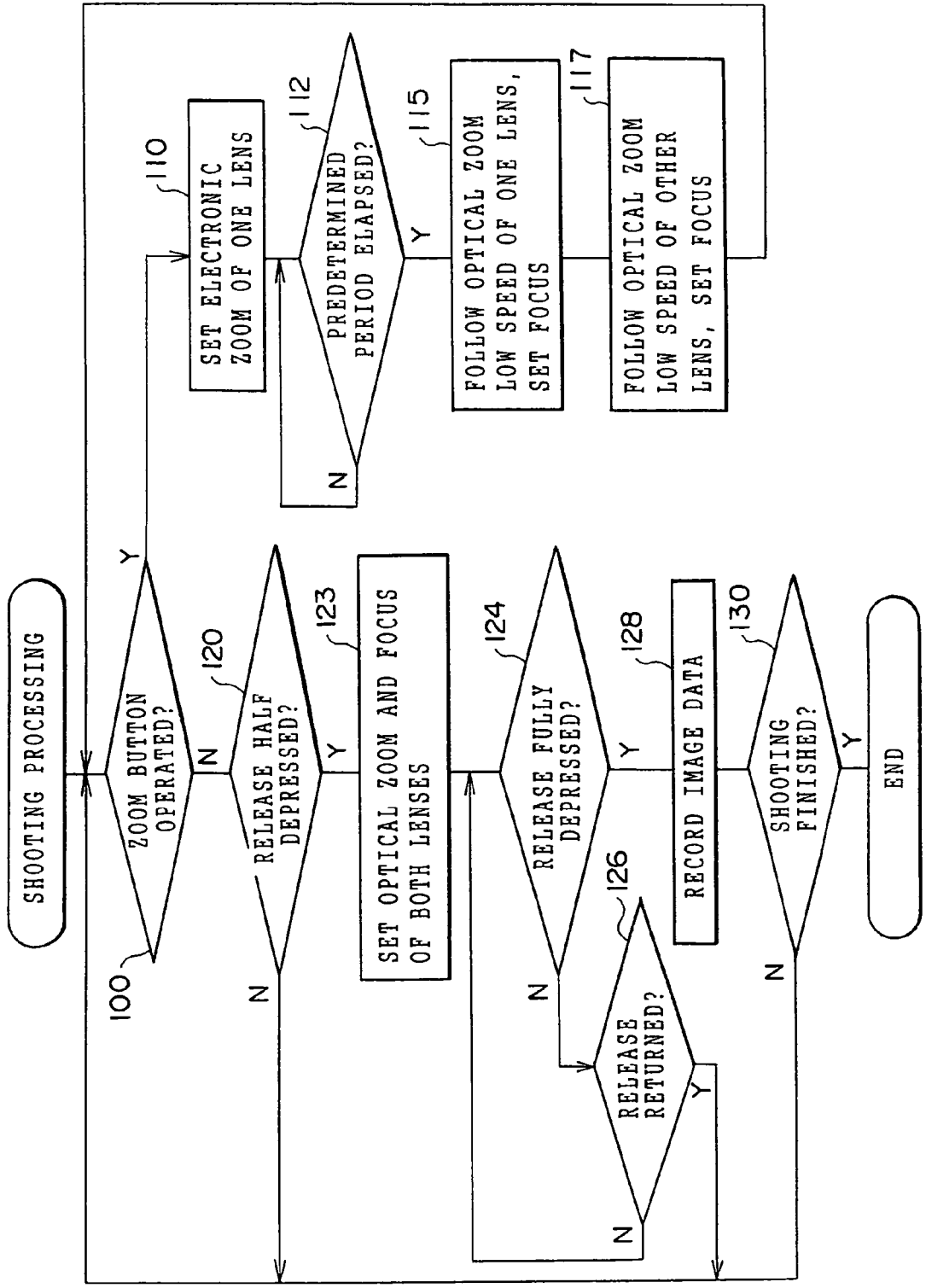
FIG. 11 is a flow chart showing the flow of photographing processing pertaining to a fifth embodiment of the invention.
Figure 12:
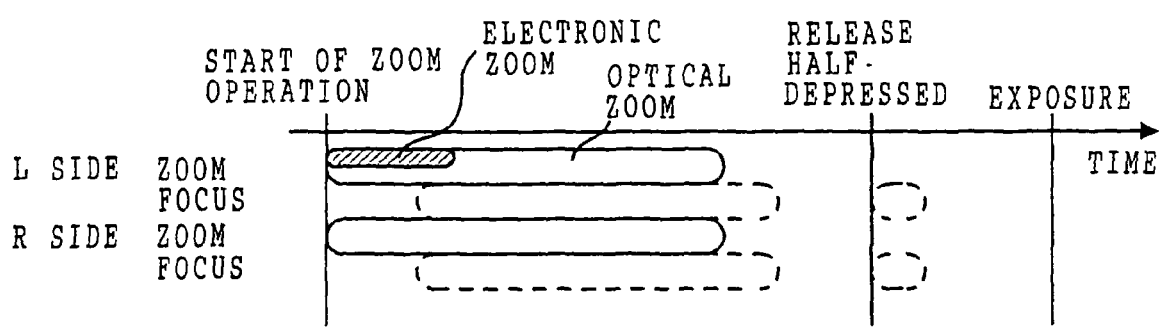
FIG. 12 is an explanatory diagram for describing a zoom operation in the fifth embodiment of the invention.

Processing of the portion relating particularly to the present invention of the processing executed in the digital camera 10 pertaining to the fifth embodiment at the time of stereo photographing will be described below with reference to FIGS. 11 and 12. FIG. 11 is a flow chart showing the flow of the portion relating particularly to the present invention of the photographing processing executed by the CPU 32 of the digital camera 10 in the case where the stereo photographing mode has been set by the mode switching switch 52B. In FIG. 11, the same step numbers as those of FIG. 9 will be given to steps where processing that is the same as that of FIG. 9 is conducted, and description thereof will be omitted. Also, FIG. 12 is an explanatory diagram showing an example of the transition of the zoom status and the focus status resulting from execution of the photographing processing.

After the elapse of the predetermined period has been waited upon in step 112, in step 115, the zoom motor 11A disposed in the optical unit 13A is controlled via the motor drive unit 50A so that the optical zoom magnifying power of the lens serving as the control target in step 110 (the lens 12A) follows the electronic zoom magnifying power applied in step 110.

At this time, the CPU 32 is configured to rotatingly drive the zoom motor 11A at a lower speed than usual, whereby the optical zoom magnifying power of the lens 12A is changed to a lower speed than usual. As the specific method of realizing this low-speed rotation, when the zoom motor 11A is a DC motor, the voltage level applied to the zoom motor 11A can be made lower than usual, and when the zoom motor 11A is a stepping motor, the pulse rate applied to the zoom motor 11A can be made slower than usual. Also, at this time, the CPU 32 is configured to lower the electronic zoom magnifying power as the optical zoom magnifying power of the lens 12A rises, whereby the total magnifying power of the electronic zoom magnifying power and the optical zoom magnifying power does not change.

Also, in step 115, focus control of the lens 12A is conducted in accompaniment with the changing of the optical zoom magnifying power of the lens 12A, and thereafter the processing moves to step 117.

In step 117, the zoom motor 11B disposed in the optical unit 13B is controlled via the motor drive unit 50B so that the optical zoom magnifying power of the lens not serving as the control target in step 115 (the lens 12B) follows the optical zoom magnifying power of the lens serving as the control target in step 115 (the lens 12A).

At this time, the CPU 32 is configured to rotatingly drive the zoom motor 11B at a lower speed than usual, whereby the optical zoom magnifying power of the lens 12B is changed to a lower speed than usual. As the specific method of realizing this low-speed rotation, when the zoom motor 11B is a DC motor, the voltage level applied to the zoom motor 11B can be made lower than usual, and when the zoom motor 11B is a stepping motor, the pulse rate applied to the zoom motor 11B can be made slower than usual.

Also, in step 117, focus control of the lens 12B is conducted in accompaniment with the changing of the optical zoom magnifying power of the lens 12B, and thereafter the processing returns to step 100.

According to this photographing processing, as shown in FIG. 12 as an example, until the release button 52A is half-depressed, electronic zoom processing is conducted so that the electronic zoom magnifying power with respect to the digital image data acquired by the lens 12A (indicated by "L side" in FIG. 12) becomes the zoom magnifying power corresponding to the operation with respect to the zoom switch 52D, the zoom motor 11A is controlled so that the optical zoom magnifying power of the lens 12A changes at a lower speed than usual following this at a predetermined time difference (in FIG. 12, there is no time difference), and focus control of the lens 12A is conducted in accompaniment with the changing of the optical zoom magnifying power of the lens 12A.

In this manner, in the digital camera 10 pertaining to the fifth embodiment, the optical zoom magnifying power of the lens 12A is set by making the rotational speed of the zoom motor 11A lower than usual. Thus, the power consumed for rotatingly driving the zoom motor 11A can be reduced in comparison to the case where the zoom motor 11A is rotatingly driven at the same rotational speed as usual.

Also, in the digital camera 10 pertaining to the fifth embodiment, the zoom motor 11B is controlled to rotate at a lower speed than usual so that the optical zoom magnifying power of the lens 12B (indicated by "R side" in FIG. 12) becomes the same as that of the lens 12A following the control of the lens 12A, and focus control of the lens 12B is conducted in accompaniment with the changing of the optical zoom magnifying power of the lens 12B.

In this manner, in the digital camera 10 pertaining to the fifth embodiment, until the release button 52A is half-depressed, the optical zoom magnifying power of the lens 12B is set by making the rotational speed of the zoom motor 11B lower than usual. Thus, the power consumed for rotatingly driving the zoom motor 11B can be reduced in comparison to the case where the zoom motor 11B is rotatingly driven at the same rotational speed as usual.

When the release button 52A has been half-depressed, only in the case where at least one of the lens 12A and the lens 12B is not at the final optical zoom magnifying power corresponding to the operation of the zoom switch 52D, the corresponding zoom motor is controlled to be a higher speed than usual so that the lens is at the optical zoom magnifying power, and focus control of both lenses is conducted regardless of that control. In FIG. 12, a case is shown where the optical zoom magnifying powers of both lenses become the final optical zoom magnifying power at the point in time when the release button 52A has been half-depressed.

Namely, when the release button 52A has been half-depressed, the optical zoom magnifying powers of both the lens 12A and the lens 12B at least approach the final optical zoom magnifying power. Thus, the changing period of the optical zoom magnifying powers of the lens 12A and the lens 12B at the time of photographing can be significantly shortened in comparison to conventional technology where electronic zoom processing is conducted with respect to digital image data obtained by both lenses prior to photographing and the optical zoom magnifying powers of both lenses are set to final values at the time of photographing. As a result, the time difference between the timing of the photographing instruction and the timing of the actual photographing can be significantly shortened.

As described in detail above, according to the present embodiment, until the release button 52A is operated, electronic zoom processing is conducted so that the zoom magnifying power where the optical zoom magnifying power of the lens 12A and the electronic zoom magnifying power with respect to the subject image imaged by the lens 12A are combined becomes a zoom magnifying power corresponding to the operation with respect to the zoom switch 52D, the lens 12A is controlled to move at a lower speed than usual, and the optical zoom magnifying power of the lens 12B is controlled to move at a lower speed than the usual moving speed of the lens 12B and to follow the change in the optical zoom magnifying power of the lens 12A. Thus, the power consumption at the time of zooming can be reduced, and the time difference between the timing of the photographing instruction and the timing of the actual photographing can be shortened.

It should be noted that the flows of the photographing processing described in each of the preceding embodiments (see FIGS. 3, 5, 7, 9 and 11) are only examples and can be appropriately changed within a range that does not deviate from the gist of the invention.

Moreover, the configuration of the digital camera 10 described in each of the preceding embodiments (see FIGS. 1 and 2) is only an example and can be appropriately changed within a range that does not deviate from the gist of the invention.

For example, in each of the preceding embodiments, a case was described where two lenses—the lens 12A and the lens 12B—were applied as the plural lenses of the invention, but three or more lenses can be applied as the plural lenses of the invention. In this case, at least one of the lenses of the three or more lenses are made to act in the same manner as the lens 12A of the preceding embodiments, and at least one of the other of the lenses are made to act in the same manner as the lens 12B. In this case also, effects that are the same as those of the preceding embodiments can be provided.

Further, in the first and sixth aspects, the camera further includes a detecting unit that detects a first state and a second state of the photographing operation unit, and the control unit, until the photographing operation unit is operated to become the first state, controls the moving unit corresponding to the one of the plural lenses so that the optical zoom magnifying power of the one of the lenses becomes the zoom magnifying power corresponding to the operation with respect to the zoom operation unit, and when the detecting unit detects that the photographing operation unit becomes the first state, controls the moving unit corresponding to the other one of the lenses so that the optical zoom magnifying power of the other one of the lenses becomes the zoom magnifying power corresponding to the operation with respect to the zoom operation unit.

Moreover, the photographing operation unit is a button which is depressed when executing photographing, the second state is a state in which the button is fully depressed to instruct photographing, and the first state is a state in which the button is depressed with a predetermined amount that is between non-depressed state and a fully depressed state.

Further, in the fourth and ninth aspects, when controlling the corresponding moving unit of the one of the lenses so that the optical zoom magnifying power of the one of the lenses follows the changing of the electronic zoom magnifying power resulting from the electronic zoom processing at the predetermined time difference, the electronic zoom magnifying power is changed in accordance with the changing of the optical zoom magnifying power of the one of the lenses so that total magnifying power of the optical zoom magnifying power of the one of the lenses and the electronic zoom magnifying power is not changed.

Further, in the fifth and tenth aspects, the control unit controls the corresponding moving unit of the one of the lenses so that the optical zoom magnifying power of the one of the lenses follows the changing of the electronic zoom magnifying power resulting from the electronic zoom processing at a predetermined time difference, or controls the corresponding moving unit of the one of the lenses so that the optical zoom magnifying power of the one of the lenses follows the changing of the electronic zoom magnifying power resulting from the electronic zoom processing without time difference.

What is claimed is:

1. A stereoscopic camera, comprising:
   a first optical system generating an optical image with a stereoscopic effect, the first optical system including
      a first lens disposed at a first position imaging a subject image on a first imaging element, and
      the first imaging element, the subject image being recorded from the first imaging element;
   a second optical system generating an optical image of the subject image with the stereoscopic effect in the same manner as the first optical system, the second optical system including
      a second lens having the same shape and same optical zoom magnifying power as the first lens, the second lens disposed at a second position different than the first position, imaging the subject image on a second imaging element, and
      the second imaging element having the same light sensitivity as the first imaging element, the subject image being recorded from the second imaging element;
   plural moving units including a first moving unit moving the first lens in an optical axis direction to change an optical zoom magnifying power of the first lens, and a second moving unit moving the second lens in the optical axis direction to change an optical zoom magnifying power of the second lens;
   a zoom operation unit including a zoom switch that is operated by a user when changing a zoom magnifying power of the subject image;
   a photographing operation unit including a shutter button that is operated when executing photographing, the shutter button being fully depressed to instruct photographing;
   a detecting unit that detects a first state or a second state of the shutter button, the first state being a state when the shutter button is not depressed after the zoom switch is operated, the second state being a state when the shutter button is depressed an amount less than fully depressed amount after the zoom switch is operated; and
   a control unit that, when the detecting unit detects the shutter button is in the first state, controls the first moving unit so that the optical zoom magnifying power of the first optical system becomes a zoom magnifying power dictated by an operation of the zoom operation unit and a part of a focusing operation of the first lens is performed, and when the detecting unit detects that the shutter button is in the second state, controls the second moving unit so that the optical zoom magnifying power of the second optical system becomes the zoom magnifying power dictated by the operation of the zoom operation unit and remainder of the focusing operation of the first lens is performed,
   wherein the first and second lenses are controlled by the control unit using the corresponding moving units respectively.

2. The camera of claim 1, wherein the shutter button of the photographing operation unit is a button which is depressed when executing photographing, the first state is a state in which the button is not depressed, a third state is a state in which the button is fully depressed to instruct photographing, and the second state is a state in which the button is depressed with a predetermined amount that is between the first state and the third state.

3. The camera of claim 1, wherein the photographing operation further includes stereo photographing that is carried out by using the first lens and the second lens.

4. The camera of claim 1, wherein a focusing operation of the second lens is performed in the second state.

5. The camera of claim 1, further comprising:
   a display section that displays the subject image having the zoom magnifying power corresponding to the operation for the zoom switch.

6. A zoom control method of a stereoscopic camera provided with a first optical system generating an optical image with a stereoscopic effect, the first optical system a first lens disposed at a first position imaging a subject image on a first imaging element, the subject image being recorded from the first imaging element, a second optical system generating an optical image of the subject image with the stereoscopic effect in the same manner as the first optical system, the second optical system including a second lens having the same shape and same optical zoom magnifying power as the first lens, the second lens disposed at a second position different than the first position, imaging the subject image on a second imaging element having the same light sensitivity as the first imaging element, the subject image being recorded from the second imaging element, the method comprising:
   operating a photographing operation unit that includes a shutter button that is operated when executing photographing, the shutter button being fully depressed to instruct photographing;
   detecting a first state of the shutter button by a detecting unit, the first state being a state when the shutter button is not depressed after a zoom switch of a zoom operation unit is operated by a user;
   moving with a first moving unit the first lens in an optical axis direction so that optical zoom magnifying power of the first optical system becomes a zoom magnifying power dictated by an operation of the zoom operation unit and performing a part of a focusing operation of the first lens, in response to detecting the first state;

detecting a second state of the shutter button by the detecting unit, the second state being a state when the shutter button is depressed an amount less than fully depressed amount after the zoom switch is operated by the user; and moving with a second moving unit the second lens in the optical axis direction so that optical zoom magnifying power of the second optical system becomes the zoom magnifying power dictated by the operation of the zoom operation unit and performing a remainder of the focusing operation of the first lens, in response to the detecting the second state, wherein the first and second lenses are controlled by the control unit using the corresponding moving units respectively.

7. The zoom control method of claim 6, wherein the shutter button of the photographing operation unit is a button which is depressed when executing photographing, the first state is a state in which the button is not depressed, a third state is a state in which the button is fully depressed to instruct photographing, and the second state is a state in which the button is depressed with a predetermined amount that is between the first state and the third state.

8. The zoom control method of claim 6, wherein the photographing operation further includes stereo photographing that is carried out by using the first lens and the second lens.

9. The zoom control method of claim 6, further comprising:
performing focusing operation of the second lens in the second state.

10. The zoom control method according to claim 6, further comprising:
displaying on a display section the subject image having the zoom magnifying power corresponding to the operation of the zoom switch.

* * * * *